United States Patent
Pillay et al.

(10) Patent No.: US 11,699,329 B2
(45) Date of Patent: Jul. 11, 2023

(54) SYSTEMS AND METHODS FOR PREDICTING ASPECTS OF AN UNKNOWN EVENT

(71) Applicant: Fusion Holdings Ltd, Douglas (GB)

(72) Inventors: Rodney Pillay, Douglas (IM); Sidesh Jungbahadur, Douglas (IM)

(73) Assignee: Games Global Operations Limited, Douglas (IM)

(*) Notice: Subject to any disclaimer, the term of this patent is extended or adjusted under 35 U.S.C. 154(b) by 255 days.

(21) Appl. No.: 17/092,444

(22) Filed: Nov. 9, 2020

(65) Prior Publication Data

US 2021/0142626 A1    May 13, 2021

(30) Foreign Application Priority Data

Nov. 8, 2019    (GB) .................................. 1916286

(51) Int. Cl.
*G07F 17/32*    (2006.01)
*G06N 5/022*    (2023.01)
*G06N 5/025*    (2023.01)

(52) U.S. Cl.
CPC ......... *G07F 17/3288* (2013.01); *G06N 5/022* (2013.01); *G06N 5/025* (2013.01)

(58) Field of Classification Search
CPC .. G07F 17/3288; G07F 17/3262; G07F 17/32; G07F 17/323; G06N 5/022; G06N 5/25; G06Q 50/34

See application file for complete search history.

(56) References Cited

U.S. PATENT DOCUMENTS

| | | |
|---|---|---|
| 9,336,483 B1 | 5/2016 | Abeysooriya |
| 2011/0028195 A1* | 2/2011 | Pennington ............. A63F 13/65 463/2 |
| 2012/0158510 A1* | 6/2012 | Gill ...................... G06Q 10/101 705/14.58 |
| 2014/0066189 A1 | 3/2014 | Brooks |

(Continued)

FOREIGN PATENT DOCUMENTS

WO    2018057530 A1    3/2018

OTHER PUBLICATIONS

European Patent Office, Extended European Search Report dated Mar. 31, 2021, issued in connection with European Patent Application No. 20206058.8, 8 pages.

*Primary Examiner* — James S. McClellan
*Assistant Examiner* — Ross A Williams
(74) *Attorney, Agent, or Firm* — McDonnell Boehnen Hulbert & Berghoff LLP

(57) ABSTRACT

Example embodiments relate to predicting aspects of an unknown event. A system may involve an electronic device communicatively coupled to a server. The server may provide a set of possible parameters relating to an unknown event to the electronic device. The electronic device may enable a user to select predicted parameters via a user interface and may further transmit the predicted parameters to the server. The server may generate a combination from the set of possible parameters to use to retrieve a prerecorded event and transmit the event to the electronic device for display to the user. The server may also compare the predicted parameters to the generated parameters to determine a result and provide the result to the electronic device for display to the user.

20 Claims, 20 Drawing Sheets

(56) References Cited

U.S. PATENT DOCUMENTS

| | | |
|---|---|---|
| 2014/0256407 A1 | 9/2014 | Graf |
| 2018/0330574 A1 | 11/2018 | Wright |
| 2019/0060760 A1 | 2/2019 | Krishnamurthy |
| 2022/0180701 A1* | 6/2022 | Huke .................. G07F 17/3227 |
| 2022/0270447 A1* | 8/2022 | Choung .............. G07F 17/3225 |
| 2022/0284478 A1* | 9/2022 | Lutnick .............. G06Q 30/0267 |

* cited by examiner

| BALANCE 120 000 00 | | | | | BET $0.00 08:55 |
|---|---|---|---|---|---|
| OUTCOME | | PLAYER NUMBER | | | GOAL ATTEMPT |

| OUTCOME | | | PLAYER NUMBER | | | GOAL ATTEMPT |
|---|---|---|---|---|---|---|
| GOAL 1:1 | | EVEN 1:1 | ONE 17:1 | ODD 1:1 | | HEAD 5:1 |
| | | | 2 TO 6 3:1 | | | RIGHT FOOT 1:1 |
| SAVE 5:1 | MISS 3:1 | | 7 TO 11 1:1 | | | LEFT FOOT 3:1 |
| GOAL POST 11:1 | OFFSIDE 33:1 | | 12 TO 18 11:1 | | | OTHER 11:1 |
| | | | >18 8:1 | | | |

FAVORITES — REBET — — UNDO — CLEAR — KICK OFF

```
{
    "fileName": "99-BigTom-miss-right_1.mp4",
    "metadata": {
        "Outcome": 0,
        "NoGoalOutcome": 0,
        "GoalAttempt": 0,
        "PlayerNumberCategory": 1,
        "Player": {
            "Number": "99",
            "Name": "BigTom",
        },
        "Home": {
            "Team": "BigCityPlayers",
            "League": "English Premier League",
            "Country": "England",
            "Logo": "BigCity",
        },
        "Away": {
            "Team": "SmallCityPlayers",
            "League": "English Premier League",
            "Country": "England",
            "Logo": "SmallCity",
        },
        "Year": "2018",
        "PlayerTeam": "Home"
    }
}
```

```
{
    "fileName": "6-Smith-goal-head_1.mp4",
    "metadata": {
        ...
        "Year": "2018",
        "PlayerTeam": "Away",
        "Events": [
            {
                "PlayerNumber": 6,
                "PlayerName": "Smith",
                "event": "pass",
                "time": "0.00"
            },
            {
                "PlayerNumber": 7,
                "PlayerName": "Rogers",
                "event": "pass",
                "time": "3.00"
            },
            {
                "PlayerNumber": 6,
                "PlayerName": "Smith",
                "event": "pass",
                "time": "9.00"
            },
            {
                "event": "goal",
                "time": "10.00"
            }
        ]
    }
}
```

SYSTEMS AND METHODS FOR PREDICTING ASPECTS OF AN UNKNOWN EVENT

CROSS REFERENCE TO RELATED APPLICATION

The present patent application claims priority to United Kingdom Patent Application No. 1916286.6, filed on Nov. 8, 2019, all of which is hereby incorporated by reference in their entirety.

FIELD

The present disclosure relates generally to systems and methods for predicting aspects of an unknown event.

BACKGROUND

A prediction can be defined as an inference based on presently observed events and contextual knowledge, with the conclusion being a thought regarding a likely outcome of the event.

Some individuals enjoy making predictions about the outcome of a given event after presented with partial information about the event scenario. For example, if given knowledge about the win-loss records of two sports teams, individuals may try to predict the winner and loser of a head-to-head matchup between the two sports teams.

Predictions can be made about a variety of different events including a weather forecast, a sporting event, a newsworthy event, or a life event. If an individual has only partial information about an event scenario (and no information about the outcome of the event), it is possible to make predictions about, and wager on, events that have already occurred.

Furthermore, in conjunction with the predictions about the outcome of a given event, some individuals may enjoy placing a wager or bet on the predicted outcome of the event.

However the process of being provided with partial information about an event scenario (but not about the event's outcome), obtaining an individual's prediction, obtaining a corresponding wager, providing information about the event's outcome, and resolving the prediction/wager after the outcome of the event becomes known can be slow, serial process. For example, within the context of horse racing, specific races may occur in a serial fashion—one race (e.g., one prediction/wager opportunity) every thirty minutes or potentially even less frequently.

Accordingly, there is a need for methods and systems that provide individuals with a way to quickly and efficiently obtain partial information about event scenarios upon which they can make predictions and corresponding wagers. There is also a need for methods and systems that can provide efficient ways to obtain an individual's prediction and corresponding wager for each given event scenario. Finally, there is a need for methods and systems that may resolve event predictions and wagers in a quick and efficient manner. Such methods and systems could provide enhanced entertainment value and engagement, among other benefits.

SUMMARY

Viewed from a first aspect, the disclosure provides a computer-implemented method. The method includes providing, to an electronic device, a plurality of possible parameters allowing a user to define a predicted occurrence from a library of pre-recorded events. Additionally, the method includes receiving, from the electronic device, at least one predicted parameter. Further, the method includes generating, using a random number generator (RNG), a combination of parameters from the plurality of possible parameters provided to the electronic device so as to provide generated parameters. Still further, the method includes retrieving, from the library of pre-recorded events, an event defined by the generated parameters. Yet further, the method includes transmitting, to the electronic device, the retrieved event for provision to the user. Further, the method includes comparing the at least one predicted parameter with the generated parameters and determining a result associated therewith. Still further, the method includes transmitting, to the electronic device, the determined result.

To enable gameplay at an electronic device, a server may include one or more libraries storing pre-recorded events and other content that can be transmitted for use by the electronic device. The electronic device and the server may engage in wireless communication that enables transferring information and content to permit gameplay by a user at the electronic device. As such, video clips and other content may be added to a library stored on the server that can be used during gameplay.

A conventional technique used to add video clips to a library involves manually splicing a video of an event (e.g., a baseball game) into multiple video clips that can be used during gameplay. This manual process requires a person to watch the video to create the video clips. As a result, the manual process is typically time consuming and also vulnerable to human error. In addition, such a manual process also requires substantial effort to associate related information with a given video clip. For instance, in order for a video clip of a basketball player dunking a basketball during a game to have statistics about the player available during game play, the person manually creating the video clip might need to look up the statistics manually via the Internet to associate them with the video clip. This can greatly increase the amount of time required to create new video clips that include associated information (e.g., statistics, text).

To reduce delays associated with convention techniques for adding content to a library, example embodiments described herein may involve using automated techniques to add content for the library. In one embodiment, an artificial neural network (ANN) is trained to splice up videos into video clips based on parameters within each video. The ANN may be trained to detect particular events within each type of video and creating video clips based on the detected particular events. To illustrate an example, an ANN may be trained to identify and create video clips that display a home run, a strikeout, or a stolen base within videos depicting baseball games. This way, the ANN can create additional video clips to store in the library for subsequent gameplay at electronic devices. As a result, new video clips can be added during each baseball season to keep the gameplay current and non-repetitive for the users. In addition, each clip can be supplemented with additional information by the ANN or using other automated techniques.

The type of neural network can vary within examples. For instance, a convolutional neural network (CNN) is used in some examples to generate video clips and other content for gameplay from videos and images. For example, machine learning is used in some embodiments to generate video clips and other content for a library associated with the game. The machine learning technique may rely on patterns and inferences to learn how to generate content for the game. In some examples, image recognition and other computer vision techniques are used to generate content. Computer vision techniques can be used to gain a high-level understanding from digital images or videos. Image recognition can be used to identify and detect objects or features within digital images and videos. One or more techniques can be used to detect particular features within videos or images, such as the actions/movements of participants or colors of objects in an image or video. For instance, image recognition can be used to identify the name of a player that hit a homerun within a video clip to further obtain statistics or other information about the player from one or more external sources (e.g., an Internet search or a database query). In some examples, multiple automatic techniques are utilized to generate, edit, and/or augment content for gameplay.

The server may query the library for particular content to send to the electronic device for gameplay. For instance, the server may receive a request from an electronic device for soccer-related gameplay and subsequently query a library for soccer content (e.g., a video clip from a soccer game). Thus, content stored at the library may need to be organized and searchable.

A manual process for making content accessible and searchable within the library might involve identifying and associating searchable tags with each piece of content. For a video clip, a person may need to watch the video clip and manual assign searchable tags to the video clip. This process can be time consuming and might encourage assigning fewer tags overall since each tag likely takes some time and effort to select and assign.

To overcome the inefficient manual process described above, example embodiments may use automated techniques to determine and assign tags to some or all content stored at a library. The tags may be automatically applied during the generation of each video clip or other type of content stored at the library. For example, the ANN creating video clips from a video can assign one or more tags based on features identified within each video clip of an event. The tags may specify the category of the event, the outcome of the event, participants within the event, the location of the event, and other parameters identified within the video clip of the event. The server (or another computing system) can use these tags to identify content for gameplay, determine outcomes for an event, and perform other actions. For example, the server may use tags generated using image recognition to select a basketball-related video for a round of gameplay at an electronic device where the user desires placing wagers on basketball.

In some examples, the content selected by the server may be based on information from the electronic device to further customize gameplay. For example, in response to receiving a request to play a basketball-related game round, the server may transmit a video clip showing players on a particular team that is located in the same general location as the electronic device. To further illustrate, an electronic device requesting the basketball video from Indiana may receive a video clip of a basketball player that plays on a team in Indiana. Other information can be used to further customize the content selection, such as profile information associated with the user. The types of events and content selected may be based on an age, gender, or other aspects about the user, if the user opts to provide such information.

As previously discussed, example gameplay may involve a user selecting one or more parameters from a set of possible parameters via a user interface of an electronic device. Particularly, the electronic device may enable a user to place one or more wagers about a pre-recorded event that may be deemed correct or incorrect based on a video clip or other content showing the outcome of the pre-recorded event. As such, an electronic device typically uses a static layout for selecting parameters, such as a generic betting board for the user to place wagers.

To further enhance the user experience, example embodiments presented herein may involve using dynamic interfaces for presenting and receiving selections of parameters from a set of possible parameters. In particular, some embodiments involve using dynamic betting techniques to present and receive one or more wagers from a user. In one embodiment, a graphical user interface uses a dynamic arrangement of available betting options that depend on the category of event associated with the gameplay. For example, the dynamic betting board for a basketball video clip may resemble a bird's eye view of a basketball court with available bets placed in positions on the court that correspond to the bets. For instance, a user may be able to bet that a player is going to make a three-point shot by placing a betting token behind the three-point line on the dynamic betting board resembling the basketball court. Similarly, the user may be able to bet that a player is going to dunk by placing a bet on the rim of a basketball hoop of the dynamic betting board.

In some examples, a dynamic selection interface enables further types of selections. Referring back to the basketball example, the dynamic betting board resembling a basketball court may enable a user to wager guessing approximately where a player will make a shot. The user may win or lose based on the difference between where the player actually made the shot (if at all) and the location on the court selected by the user. These different types of selection options generated by the dynamic betting board can increase the overall experience of gameplay and increase the amount of selections performed by the user.

In another embodiment, the content can further be used as part of the user interface for selecting parameters (e.g., placing a wager). To illustrate an example, the gameplay involving a soccer video clip may enable a user to touch the video clip to slow down, stop, or speed up the video clip in addition. In addition, the graphical user interface can be configured such that touching features within the video clip can be used to place wagers. For instance, a graphical user interface showing the soccer video clip can enable the user to touch (or otherwise select) the left foot, the right foot, or the head of a soccer player within the video clip to bet how that soccer player may score a goal. Similarly, the GUI for a gender reveal video clip may enable a user to touch an object of a particular color (e.g., blue or pink) to bet on the gender of the baby. Other examples are possible and can depend on the particular details of the event and type of content. Thus, the gameplay can enable wagers to be placed through touch interaction on elements of the video clip. Some users may find touch interaction on elements as an easy and engaging way to participate during gameplay.

These aspects, as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE FIGURES

FIG. 14 depicts a user interface of possible parameters, in accordance with example embodiments.

FIG. 17 depicts video metadata, in accordance with example embodiments.

FIG. 19 shows additional information in a metadata format, in accordance with example embodiments.

DETAILED DESCRIPTION

I. Introduction

Figure 1:
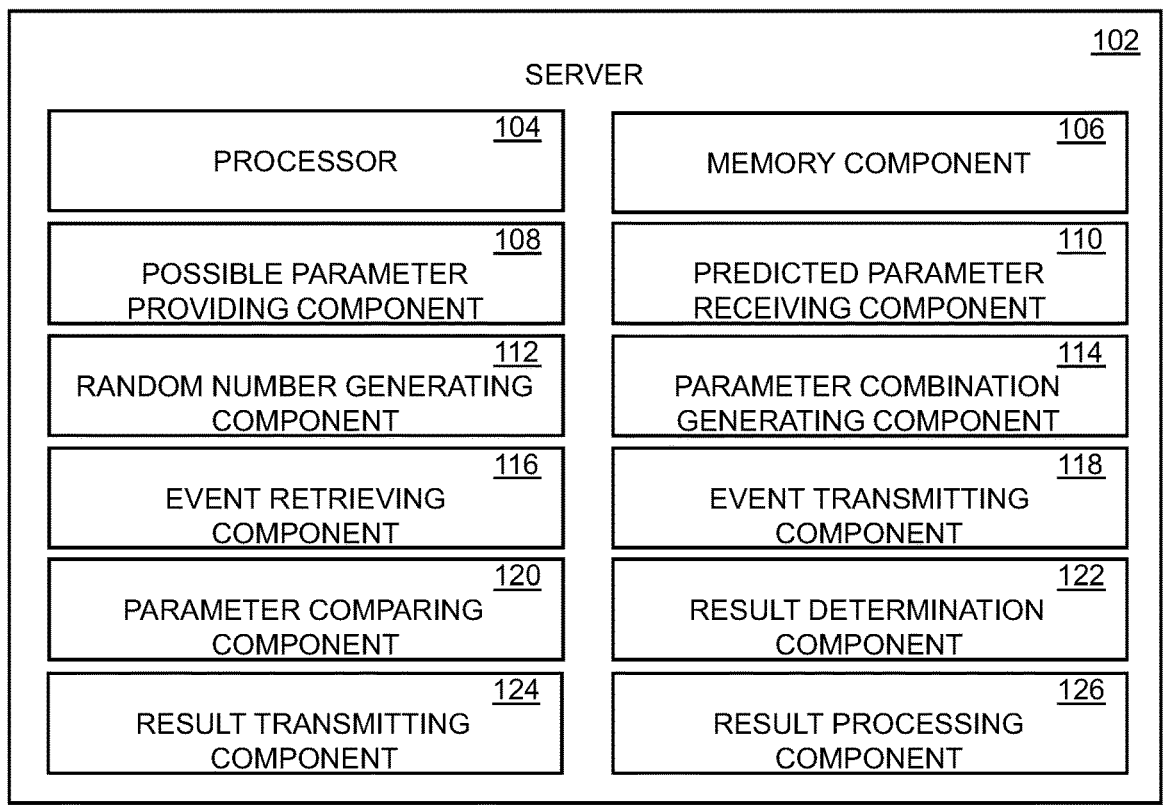
FIG. 1 is a simplified block diagram of an example server, in accordance with example embodiments.

This description describes, among other things, example embodiments including, but not limited to, embodiments pertaining to allowing a user to predict aspects, or parameters, of an as-yet unknown event. A multitude of events, possibly video clips containing specific content, may be stored in an event library, which may be stored in a database associated with a server. The server may provide a user, via an electronic device operated by the user, with a plurality of possible parameters relating to the library of events. The possible parameters may be provided in the form of options, of which the user may select some of in order to estimate and predict that they may occur during an as-yet unknown event, thereby defining a predicted occurrence. These predicted parameters may then be provided to the server.

The server may generate a random combination of possible parameters, and may then retrieve an event, for example a video file, that has parameters matching the generated parameters. The generated parameters may then simply be known as "generated parameters". The event may then be transmitted to the electronic device. By randomly selecting individual parameters, particularly related parameters, the odds for each specific parameter occurring may be adhered to, rather than if only a single random event were to be selected from the event library. Some parameters may be related, i.e. some parameters may only occur if some other parameter occurs or does not occur. Individual generation of parameters may be especially beneficial in such cases, as further explained below.

The server may also compare the predicted parameters to the generated parameters. A result associated with the user's prediction may then be determined. The result may then also be transmitted to the electronic device, and the server and electronic device may process the result as appropriate.

In an example embodiment, a user may interact with an electronic device to select a type of event that they wish to predict the outcome of, for example football (or soccer, as it may also be known). A wager or bet may accompany the estimation. The type of events may all be of a similar kind that may occur during a football match, for example a shot taken to attempt to score a goal. The user's selection may be transmitted to a server, which may in turn transmit, to the electronic device, a plurality of possible parameters relating to such event. These parameters may then be provided to the user. The possible parameters may relate to various things that may occur during the event, for example, a number on a jersey of a player taking the shot, a body part of the user with which the shot was taken, the result of the shot, and the like. A likelihood of each of the possible parameters occurring may also be presented to the user—for example, the likelihood of a goal being scored during the event may have the same likelihood as the likelihood of a miss. However, the likelihood of a goal being scored with a player's left foot, right foot, head or another body part may differ. It will be apparent that the likelihood of a predicted parameter being accurately selected by a user will impact the user's return, should the parameter be found to be accurately predicted. In addition, as more than one parameter may occur during an event and may be selected by and wagered on by a user, the type of wager may be referred to as a "multi-factorial" wager.

The user may predict only a single parameter, for example a goal scored or not scored. The user may, however, predict multiple additional parameters, such as the number of a player that takes the shot, and the body part with which the goal has been attempted. The user may be allowed to place a wager on their prediction, and may select a desired value of the wager, possibly between a minimum and maximum value.

When a user elects to proceed, their predicted parameters may be transmitted to the server. The server then randomly generates a selection of parameters, referred to as generated parameters, for the specific instance of play. Then, the server retrieves an event from the event library that matches the generated parameters. All events stored in the event library are classified so that the parameters applicable to them may available for viewing and use by the server. The event, which in the present embodiment is a video clip of a goal attempt by a player, is then transmitted to the electronic device. The server may also compare the generated parameters with the predicted parameters and calculate a result of the compare. The result may also be transmitted to the electronic device, and the server may further process the result as required.

The electronic device receives the event, i.e. the video clip, and provides it to the user by displaying it to them. The result is also received by the electronic device and processed on the device as applicable.

Advantageously, the systems and methods disclosed herein provide a system and method in which multiple events, typically video clips of actual events, may be stored in a library and may be displayed to users to provide results of their wagers whilst simulating a traditional sports betting environment. By allowing an RNG to generate parameters applicable to an event that is to be shown to a user, the odds of individual parameters appearing may be tailored to provide the desired experience to the user. As a multi-factorial wager system may be employed in this manner, a user has multiple parameters to predict and wager on, and therefore also to win on, a single event estimation. This may enhance a user's experience and provide unique returns to the user per round. In addition, as a user may win on any one of multiple parameters selected per round, a user may be enticed to continue playing as they may continue to win on more than one wager. If a user wins at least something per round, they may be more inclined to continue playing than if they did not win. As a user may win more often, it may lead to extended, or at least continued, play. By incorporating past, actual events in providing the results to a user, a user may experience a sport or similar event in line with their preference, thereby providing a unique experience. Some of the past events may already have been seen by the user, possibly on a highlights program or on even during the original live broadcast thereof, which may further enhance the user's experience.

It should be noted that the RNG generates individual parameters from related parameters. Some parameters may not all be possible at the same time, for example different jersey numbers of a player that attempts a shot. As a result, related parameters will be individually determined. If a single event from the library was just randomly selected, the makeup of the library would potentially impact the combination of parameters possible. By individually calculating related parameters, an operator may be able to match desired odds for each of a related parameter. This may be particularly beneficial if the odds that the operator wishes to provide is not accurately reflected in the selection of events available to them. For example, if only a single event in the library shows a player with jersey number 1 attempting and scoring a goal, it may be difficult to match the odds on such an event occurring and offered to a user if such clip may be randomly selected from a particularly extensive event database.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" with a described list of at least two terms is to indicate any of the listed terms or any combination of the listed terms.

The use of ordinal numbers such as "first," "second," "third," and so on is to distinguish respective elements rather than to denote a particular order of those elements. For the purpose of this description, the terms "multiple" and "a plurality of" refer to "two or more" or "more than one."

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

II. Example Architecture

FIG. 1 is a block diagram 100 depicting an example embodiment of a server 102 arranged to implement operations in accordance with example embodiments described herein.

The server 102 may be arranged to implement any of the methods as described herein. The server 102 may include a processor 104 arranged to execute the functions of various components, which may be provided by hardware or by software units executing on the server 102. The software units may be stored in a memory component 106, and instructions may be provided to the processor 104 to carry out the functionality of the described components. The various components can include a possible parameter providing component 108, a predicted parameter receiving component 110, a random number generating component 112, a parameter combination generating component 114, an event retrieving component 116, an event transmitting component 118, a parameter comparing component 120, a result determination component 122, a result transmitting component 124, and a result processing component 126.

The possible parameter providing component 108 may be arranged to provide an electronic device operated by a user with a plurality of parameters relating to events stored in an event library. The event library may be associated with the server 102. In some examples, the server 102 is associated with one or more event libraries.

The predicted parameter receiving component 110 may be arranged to receive one or more parameters selected and predicted by a user on the electronic device. The user-selected predicted parameters are those that the user predicts, or estimates, may form part of an as-yet unknown event to be selected from the event library in order to define a predicted occurrence.

The random number generating component 112 may be arranged to generate a plurality of random numbers, in order to select multiple of the available parameters applicable to a specific event. The parameter combination generating component 114 may, in combination with the random number generating component 112, be arranged to generate a combination of parameters, called generated parameters, for the present estimation of the user. As an example, in a football event which defines a shot taken, different possibilities may be generated, such as a body part with which an attempt at goal is made, whether the attempt is successful or not, whether an offence such as an offside offence is committed, and the jersey number of the player that made the attempt. At least one parameter from each such type of parameter may be selected by the RNG and combined by the parameter combination generating component 114. The combined parameters, or the generated parameters, may be used together to define an event.

The event retrieving component 116 may be arranged to retrieve an event, typically a video clip, with aspects matching that of the parameters selected by the random number generating component 112 and the parameter combination generating component 114, i.e. an event defined by the combination of parameters. Each event in the event library may be expected to have already been classified according to the possible parameters. Only a possible combination of parameters may be generated by the RNG. For example, a "goal scored" and a "goal not scored" parameter cannot be generated at the same time, as these are mutually exclusive for any shot.

The event transmitting component 118 may be arranged to transmit, to the electronic device operated by the user, the event. Presently, it will be the video clip of the goal attempt retrieved by the event retrieving component 116.

The parameter comparing component 120 may be arranged to compare the parameters selected by the user and received by the predicted parameter receiving component 110, and the generated parameters compiled by the parameter combination generating component 114. The comparison should reveal the user's accuracy in predicting, or estimating, the aspects of the event, which has now been identified. The result determination component 122 may be arranged to determine a result of the specific instance of estimation by the user.

The result transmitting component 124 may be arranged to transmit, to the electronic device operated by the user, the game result, and the result processing component 126 may be arranged to process the result as appropriate. This may include awarding an amount won by a user to their user account, or the like.

Figure 2:
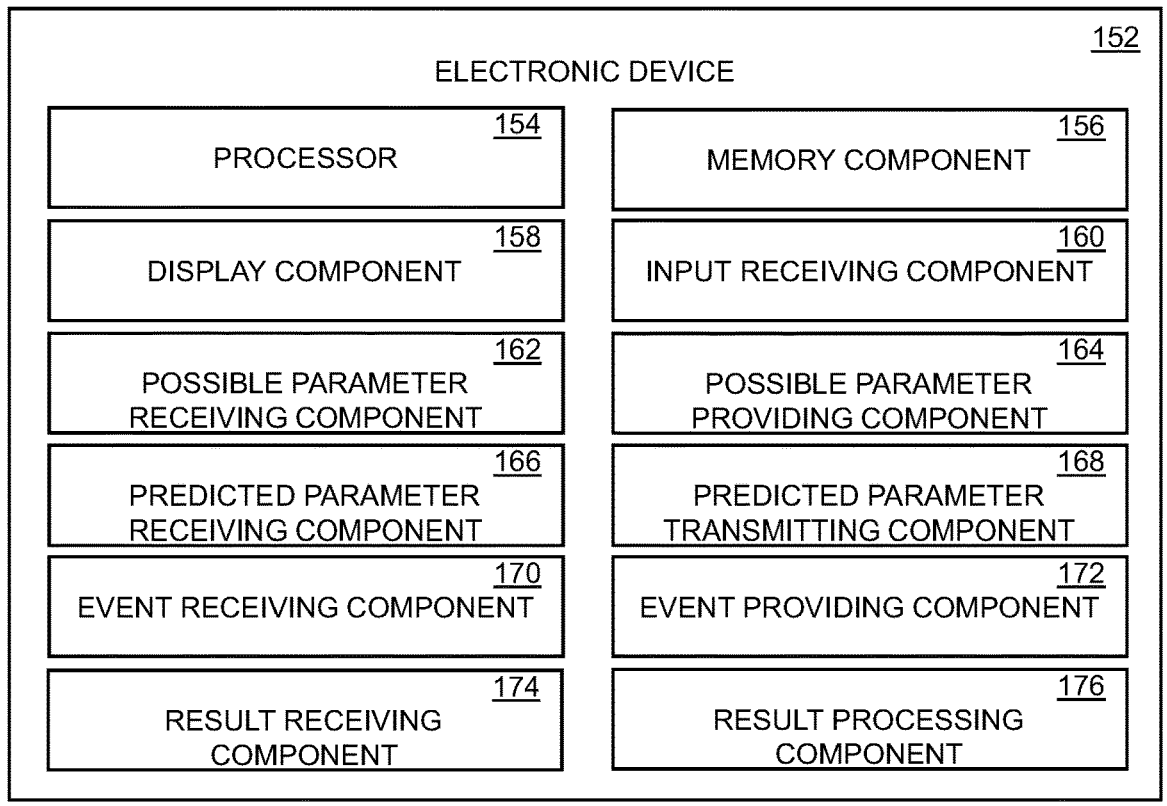
FIG. 2 is a simplified block diagram of an example electronic device, in accordance with example embodiments.

FIG. 2 is a block diagram 150 depicting an example embodiment of an electronic device 152 arranged to implement operations in accordance with example embodiments described herein. The electronic device 152 may take any of a variety of forms, including for example a dedicated gaming machine, a personal computer, a server computer, a personal digital assistant, a mobile phone, a tablet device, or some other computing device.

The electronic device 152 may be arranged to implement any of the methods as described herein. The electronic device 152 may include a processor 154 arranged to execute the functions of various components, which may be provided by hardware or by software units executing on the electronic device 152. The software units may be stored in a memory component 156, and instructions may be provided to the processor 154 to carry out the functionality of the described components. The various components can include a display component 158, an input receiving component 160, a possible parameter receiving component 162, a possible parameter providing component 14, a predicted parameter receiving component 166, a predicted parameter transmitting component 168, an event receiving component 170, an event providing component 172, a result receiving component 174, and a result processing component 176.

The display component 158 may be arranged to provide a display area which may allow the user to view elements and event required for the functionality of the present methods and systems. The input receiving component 160 may be arranged to receive user input, also required for the functionality of the present methods and systems. The input receiving component may be a touch-screen interface, associated with the display component, or may be a computer mouse, dedicated buttons, or any other suitable input device comparable with the specific type of electronic device.

The possible parameter receiving component 162 may be arranged to receive, from the server, the specific parameters from which the user may select, in order to predict aspects of the as-yet unknown event. The possible parameter providing component 154 may be arranged to provide these possible parameters to the user, possibly via the display component 158.

The predicted parameter receiving component 166 may be arranged to receive the parameters that the user wishes to select, i.e. which the user estimates (or predicts) will form part of the event and which will define the predicted occurrence during the event. This may be received via the input receiving component 160. The predicted parameter transmitting component 168 may be arranged to transmit the predicted parameters to the server. Encryption techniques are used in some examples to protect the transmission from external interruption.

The event receiving component 170 may be arranged to receive, from the server, the event identified by the server as having the parameters randomly generated with the assistance of the RNG. The event may be a video clip of an attempt on goal, in the example embodiment. Other categories of events are possible within examples. The event providing component 172 may be arranged to provide the event to the user, possibly via the display component 158.

The result receiving component 174 may be arranged to receive a result of the user's predicted parameters compared to the generated parameters from the server, and the result processing component may be arranged to process the result as appropriate. Processing the result may include, for example, displaying a user's prediction accuracy, any appropriate winnings, any celebration effect, an update to the user's account balance, and the like.

III. Example Operations

Figure 3:
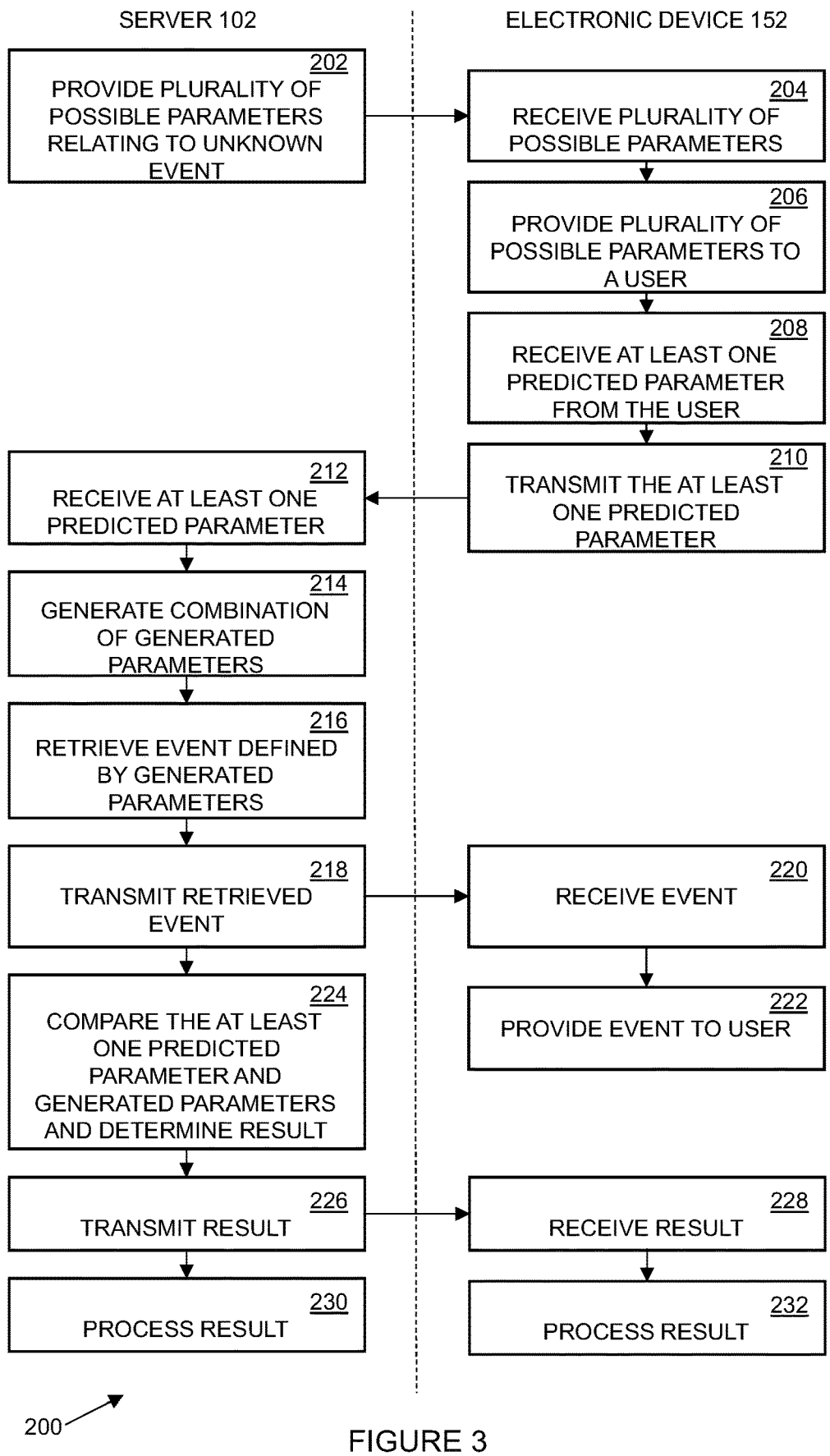
FIG. 3 is a swim-lane flow diagram in accordance with example embodiments.

FIG. 3 depicts a swim-lane flow diagram 200 that illustrates an example method that may be carried out using a server, such as the server 102 of FIG. 1, and an electronic device, such as the electronic device 152 of FIG. 2. Operations of the method are shown within blocks 202 to 232. The example method can relate to predicting the outcome of an unknown recorded event. Any operation described below, or elsewhere in this description, with respect to FIG. 3, can be performed, at least in part, by a processor, such as the processors 104 and 154 executing software program instructions. In some embodiments, one or more articles of manufacturing includes a non-transitory computer readable medium, having stored thereon program instructions that upon execution by a processor, cause the processor to perform one or more of the operations shown in FIG. 3.

In the embodiment detailed by the present flow diagram 200, a user may provide selected parameters which they predict will occur in an event, after which a server identifies an event with multiple possible parameters, which is then presented to the user and that they may use to predict parameters with. A user may place a multi-factorial wager as part of their predicted parameters, and one or more of their selected parameters may result in a win.

Block 202 includes providing, by the server and to the electronic device, a plurality of possible parameters relating to an as-yet unknown event. All the parameters so provided may potentially occur in the event, but whether they occur will be determined by the server at a later stage. Block 204 includes receiving, by the electronic device, the plurality of possible parameters. In some examples, the electronic device received the possible parameters in an encrypted packet from the server.

Block 206 includes providing the plurality of possible parameters to the user. The possible parameters may be provided on a display associated with the electronic device 152. Block 208 includes receiving, from the user and via an appropriate input device, at least one predicted parameter selected by the user which they guess will form part of the event identified by the server 102. Block 210 includes transmitting the at least one predicted parameter selected by the user to the server 102.

Block 212 includes receiving, by the server, the user-selected at least one predicted parameter defining the predicted occurrence. More than one parameter may be selected by the user, and if a wager accompanies the user's selection, it may be referred to as a multi-factorial wager, as multiple factors define the wager.

Block 214 then includes generating a combination of parameters using an RNG associated with the server, which may then be referred to as generated parameters. Parameters may be selected from specific groups, as will be more evident in later embodiments. The available parameters which the RNG may select from when generating parameters may all be found in a specific event stored in an event library, and as a result a multi-factorial wager is possible in the present embodiment.

Block 216 then includes retrieving an event from the event library that has a combination of parameters that matches the generated parameters. It is envisaged that the event library may be sufficiently large so that there are multiple different events with the same specific parameters applicable to them, which may be selected. This may ensure that, even after the same combination of parameters is generated by the server, the user need not be presented with the same event, presently a video clip, for viewing. It will be apparent that the library may be continuously expanded with additional events so that a user may be presented with the latest content during use of the present systems and methods.

Block 218 then includes transmitting, to the electronic device, the retrieved event, and block 220 includes receiving, by the electronic device 152, the event. In block 222, the electronic device 152 may provide the event to the user. When, as in the present embodiment, the event is a video clip, it may be provided to the user by displaying it to the user on a display associated with the electronic device 152.

Block 224 includes the server comparing the at least one predicted parameter with the generated parameters, and determining a result from the comparison. For example, if the user has predicted one parameter correctly, they may be rewarded in a specific manner. Any additional correctly predicted parameter may result in further rewards. However, any incorrectly predicted parameters may not provide any reward. It should be noted that the multi-factorial nature of wagers associated with the present embodiment provides a user with multiple ways to be rewarded, or to win, on a single event.

Block 226 provides transmitting the result of the comparison to the electronic device, which in turn receives the result in block 228.

Block 230 includes the server processing the result as appropriate, and block 232 includes the electronic device processing the result as appropriate.

Any of the blocks of a flow diagram or a component in a block diagram may be provided by hardware or by software associated with the specific electronic device, whether the server or the electronic device. These electronic devices may be embodied by a personal computer, laptop computer, personal digital assistant, smartphone, feature phone, satellite phone, server computer, phablet, tablet, wearable computer, or the like. Appropriate components may form part of such a device for the operation of the required method on that device. Further, the electronic devices may be configured to communicate wirelessly or over a wired communication network. The various components forming part of each electronic device may be configured to communicate with each other via an appropriate communication interface, while an appropriate external communication interface may facilitate communication with other electronic devices, whether forming part of the present systems or not.

Notably, the feature of allowing a multi-factorial wager on an event that may be related to an actual past occurrence in which the user may have a particular interest, for example football, may provide a user with multiple ways to be rewarded, while the result of their estimation is provided to them in a format that they may be particularly fond of. The multifactorial nature of wagers placed using the present systems and methods may allow a user to win in multiple ways, which may result in at least some win to the user per round. This may provide an enhanced playing experience, which may entice the user to continue playing for a longer time period. In addition, the use of footage of past event which the user may have seen, may be familiar with or may be interested in, may result in additional reasons for a user to continue participating in systems and methods of the present type. In addition, the user of a multi-factorial wager with related parameters, and an RNG that individually determines one of related parameters for a play of the game, allows the systems and method to comply with the odds offered to the user. This may be particularly helpful if the odds are intended to match real-world statistics and occurrences, and is updated.

Figure 4:
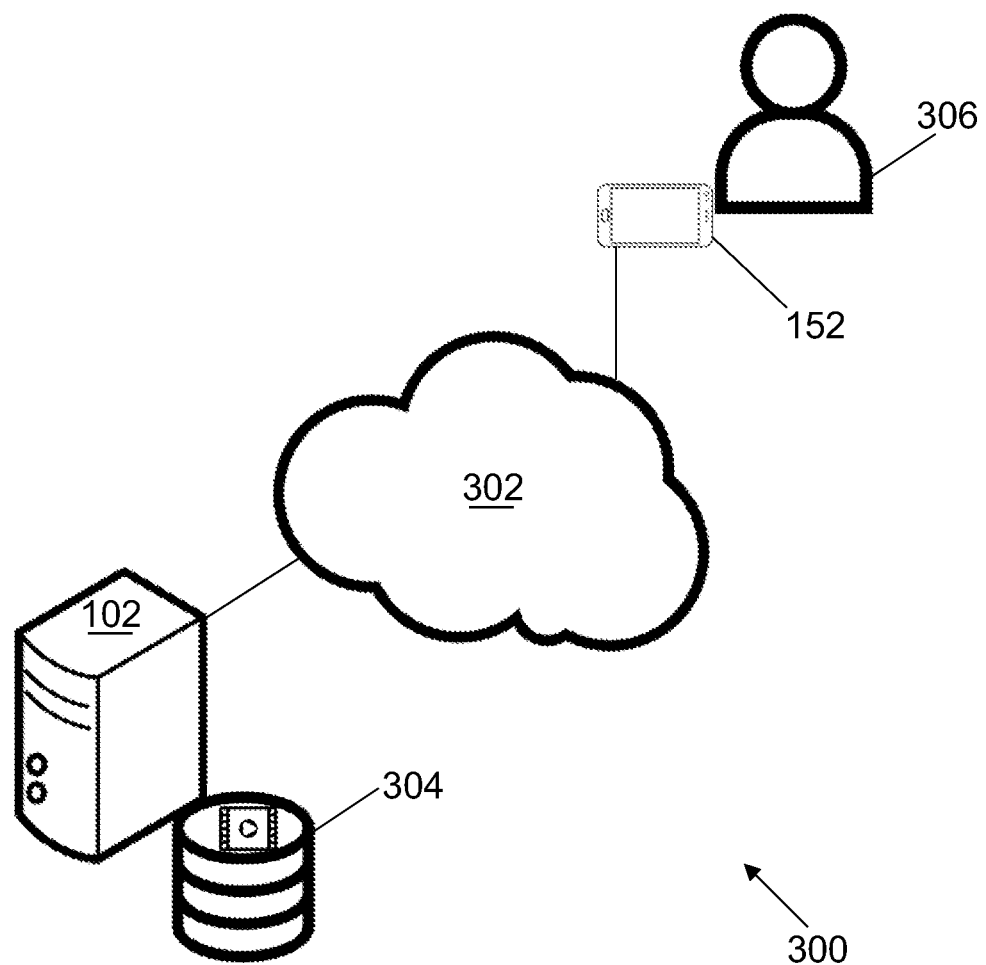
FIG. 4 is a diagram of an example system, in accordance with example embodiments.

FIG. 4 depicts a simple system diagram 300, illustrating communication between some components, such as the server 102 and the electronic device 152 of FIGS. 1 and 2.

The server 102 is in data communication with the electronic device 152 over a communications network 302, presently the Internet. The electronic device of the present embodiment is shown as a mobile communication device.

The server 102 has an event library associated therewith, which is stored on a database 304. The event library may contain various events in the form of video clips. The video clips may all be of specific occurrences in similar episodes, for example a sports game of the same type. Presently, the events are shots taken during football, or soccer, matches. Multiple event libraries may be provided, each with its own type of event. These may include different types of sport, such as football, cricket, hockey, netball, rugby, basketball, baseball, and the like. However, the events need not be limited to sports, but may relate to other similar episodes which may be recorded. It will be apparent that each type or event will include its own unique parameters which may be predicted by a user. For example, in football, parameters may be provided relating to which body part a goal attempt was made. In cricket, this is not applicable, so the same type of parameters would not be possible to predict. It will be apparent that the type of event will direct the parameters that may be provided to a user for selection. A user may be allowed to choose the type of episode, for example which sport and/or which specific event during such sports game, they wish to predict the parameters for.

The electronic device 152 is operated by a user 306, which interacts with the electronic device to provide their input as to parameters selected for prediction. While only a single electronic device and user is shown in FIG. 4, it will be apparent that the same server may be in data communication with multiple electronic devices, operated by multiple users, and which may be located at various locations as a result of the communication over a remote network such as the Internet. However, the server may only serve a local area network, for example a casino or the like.

Similarly, while only a single data server is shown, it will be apparent that multiple data servers may form part of the system and may store event libraries thereon.

Figure 5:
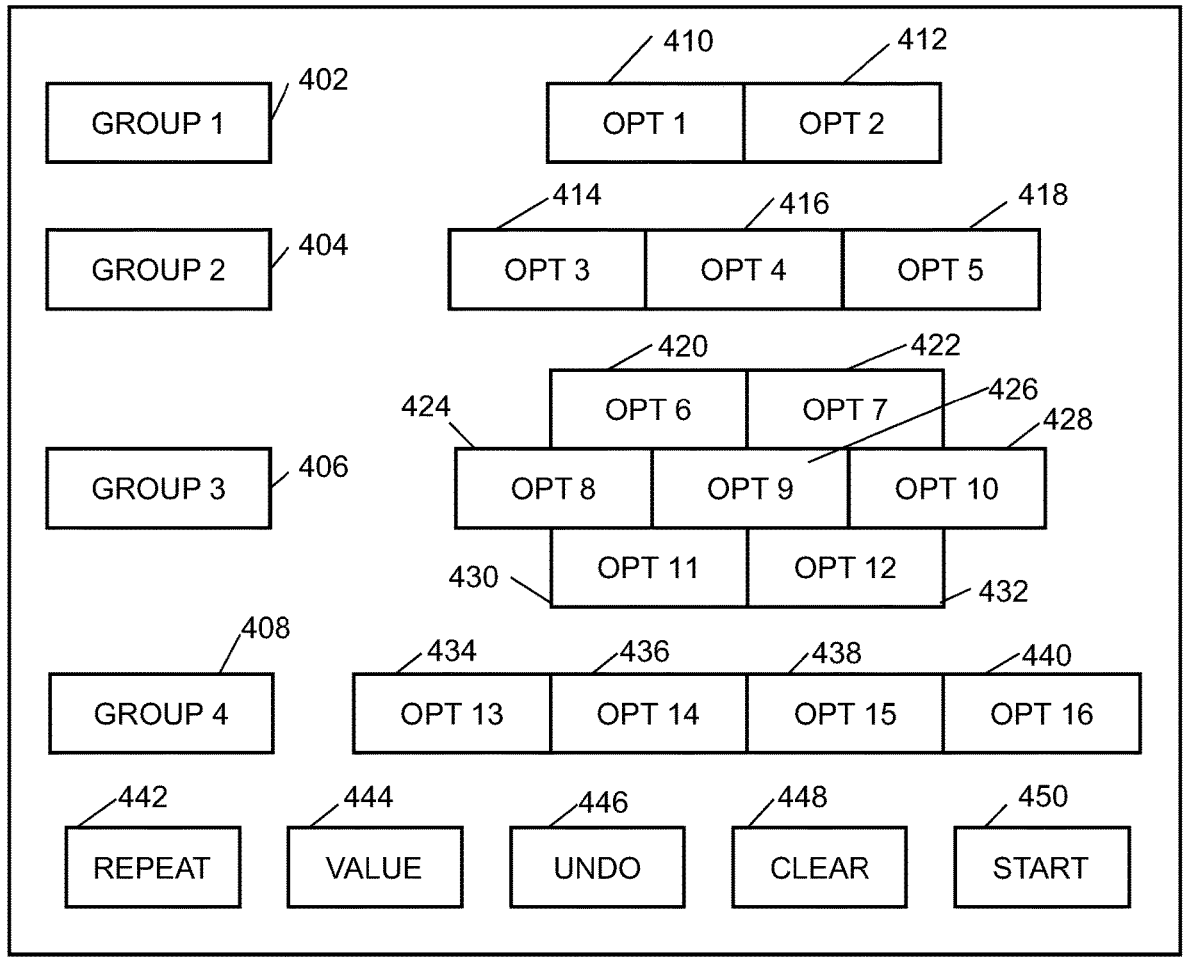
FIG. 5 a first screenshot of a display screen, in accordance with a first example embodiment.

FIG. 5 shows a generic user interface with which a user may interact with. The user interface allows a user to place a multi-factorial wager on an as-yet undetermined event. In this embodiment, four groups of parameters are provided. The groups are conveniently spaced, with their parameters grouped together, so that a user may more easily identify related parameters on which they could wager.

The different groups 402, 404, 406 and 408, respectively identified by tags GROUP 1, GROUP 2, GROUP 3 and GROUP 4, may all indicate the relationship between the parameters located next to them.

FIG. 5 relates, again, to a football wagering system. GROUP 1 may indicate that the group relates to whether a goal was scored, or not. Box 410, labelled OPT 1, may be a parameter reading "Goal scored". Box 412, next to it and labelled OPT 2, may be a parameter reading "Goal not scored". As part of each box, the potential return for correctly estimating, or predicting, that box may be provided. For "Goal scored" and "Goal not scored", the return may be the user's wager times two as one of these two must occur for each event relating to an attempt on goal. For example, if a 1 credit wager is placed on "Goal scored", and the event selected shows a goal being scored, the user may receive their 1 credit back, plus another 1 credit that they have won.

Group 2, at box 404, may relate to how a goal was missed. OPT 3, at box 414, may be that a goalie has saved the shot. OPT 4, at block 416, may be that a player was offside, and OPT 5, at block 418, may be that the shot has missed the goal. Again, the return for correctly predicting the manner that the goal was missed may be provided in each relevant box. Here, the return will not be as simple as a return of a wager times two.

It will be apparent that the likelihood of any parameter being generated may be manipulated by the server and the configuration of the RNG and parameter combination generating component. In at least some embodiments, the odds, or likelihood, of a parameter being generated may be configured such that it mirrors actual gameplay statistics. For example, the likelihood of an offside call leading to a missed goal, may take place in approximately 1 out of 5 goal attempts. The system may be configured to provide similar odds to that parameter being generated by the server, with the result that gameplay results may at least partially mimic actual live sporting events. Similar methods may be employed to generate the odds for the other types of misses, presently saved by the goalie and that the shot missed the goal. Individual RNG calculation of related parameters allows these odds to be complied with.

It should further be noted that not all related parameters may need to be calculated during the generation of parameters. For example, if the RNG determines that a goal was scored, there is no need to generate the parameters specifying how a goal was missed. For each type of event, these inter-related parameters will of course differ.

It is envisaged that the parameters provided for a specific group may not be all possible parameters, or that at least one parameter is relatively unlikely to occur. This may contribute to an operator of the system receiving some return on wagers placed on the system in that that specific event is unlikely to be selected, or unlikely to occur and wagers placed on those parameters would be unlikely to yield a return to a user. However, if the user accurately predicts such an unlikely event, their return may be substantial.

Group 3, at box 406, may include parameters relating to the jersey number of a player that attempts a shot. OPT 6, at box 420, may be that a player's number is an odd number, and OPT 7, at box 422, may be that a player's number is even. These two parameters also provide a 50/50 likelihood of occurring, and a user's potential return may be their bet times two. Put another way, their nett winnings may match their wager size.

OPT 8, at box 424, may be that a player's jersey number is number 1, OPT 9, at box 426, may be that a player's jersey number is from 2 to 6, OPT 10, at box 428, may be that a player's jersey number is from 7 to 11, OPT 11, at box 430, may be that a player's jersey number is from 12 to 18, and OPT 12, at box 432, may be that a players jersey number is over 18.

The likelihood of a player's jersey number occurring may mirror that of a live game, given that the events are video clips from actual games that have been recorded. As a goalie's jersey number is generally 1, and a goal attempt by a goalie is a rare occurrence, the likelihood of a goal attempt being made by a player with a jersey number 1 is very low. Similarly, other parameters that are in a similar group may also include odds that mirror live play, in order to provide a realistic feel to users. It will be apparent that the type of events, and type of sports to which events relate, will each have their own characteristics that influence the likelihood of an event occurring and that may be mirrored by the odds offered thereon.

Group 4, at box 408, may relate to the body part with which a player attempted a shot. OPT 13, at box 434, may be that the shot was attempted with a player's right foot, OPT 14, at box 436, that the shot was attempted with a player's left foot, OPT 15, at box 438, that the shot was attempted with a player's head, and OPT 16, at box 440, that the shot was attempted with any other body part. Again, the odds may be provided with each parameter, and the odds may match that which would be expected during any live football match. For example, the likelihood that a shot was taken with a player's right foot may be the highest, left foot second highest, head third highest, and other body part the lowest. Again, the odds will relate to the potential return of a user, should the user correctly predict the eventual generated parameters.

Buttons are also provided on the display. A repeat button 442 may allow a user to repeat a previous selection, a value button 444 may allow a user to change a value of a bet, an undo button 446 may allow a user to undo a previous action, a clear button may clear all current wagers placed on various parameters, and a start button may initiate sending the selected parameters to the server. Button configurations may off course be modified by an operator as desired.

Using the present embodiment, a user may wish to place a multi-factorial wager on a shot taken event, which they do not yet know any particulars of. The user may wish to wager that the shot will not lead to a goal (i.e. that a goal will not be scored), that the goalie will save the shot, that the number on the jersey of the player that attempts the shot will be an even number, and that the attempt on goal will be taken with the player's head. The user may then select the appropriate parameters, by defining the predicted occurrence by means of a multi-factorial wager, on the user interface of FIG. 5. A user may adjust the size of their wager by selecting the "Value" button 444 before selecting the appropriate parameter on which they wish to place the wager. Selecting a parameter may show a token with a value appear on the parameter, to show the size of the wager placed thereon.

Figure 6:
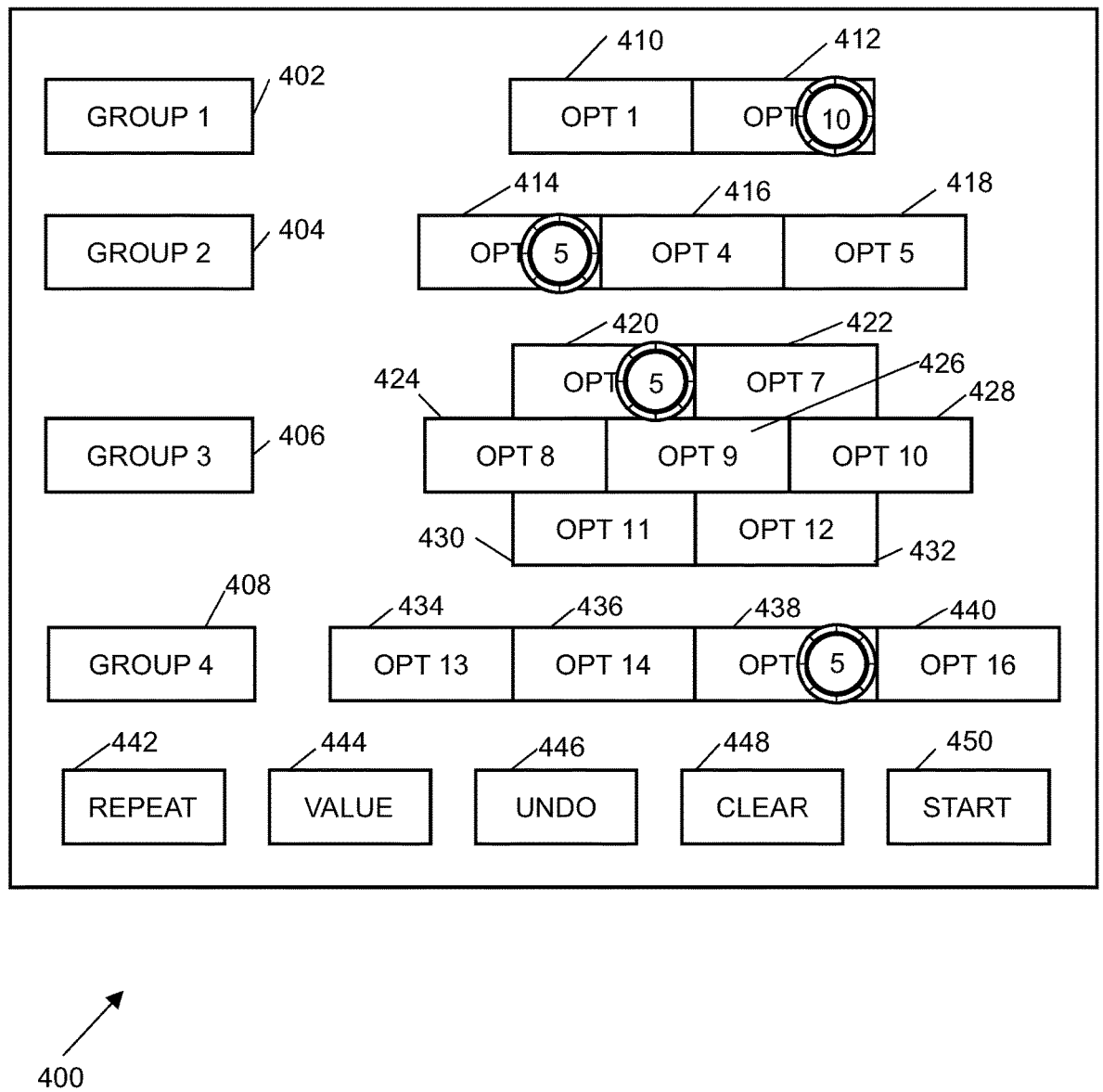
FIG. 6 is a second screenshot of a display screen, in accordance with the first example embodiment.

FIG. 6 shows the user interface of FIG. 5 after the user's desired wager amounts have been placed on the appropriate parameters. OPT 2, for a missed goal, has 10 credits placed thereon. OPT 3, for a save by the goalie, has 5 credits placed thereon. OPT 6, for an even player's jersey number, has 5 credits placed thereon. Finally, OPT 15, for a shot attempted by the player's head, has 5 credits placed thereon. Once the user is happy with their wager amount and the various parameters, they may select the "Start" button 450.

As described above with reference to FIG. 3, this sends the selected parameters to the server, which in turn generates its own set of parameters and identifies a corresponding event for display to the user. The event is then transmitted to the electronic device for display to the user.

Figure 7:
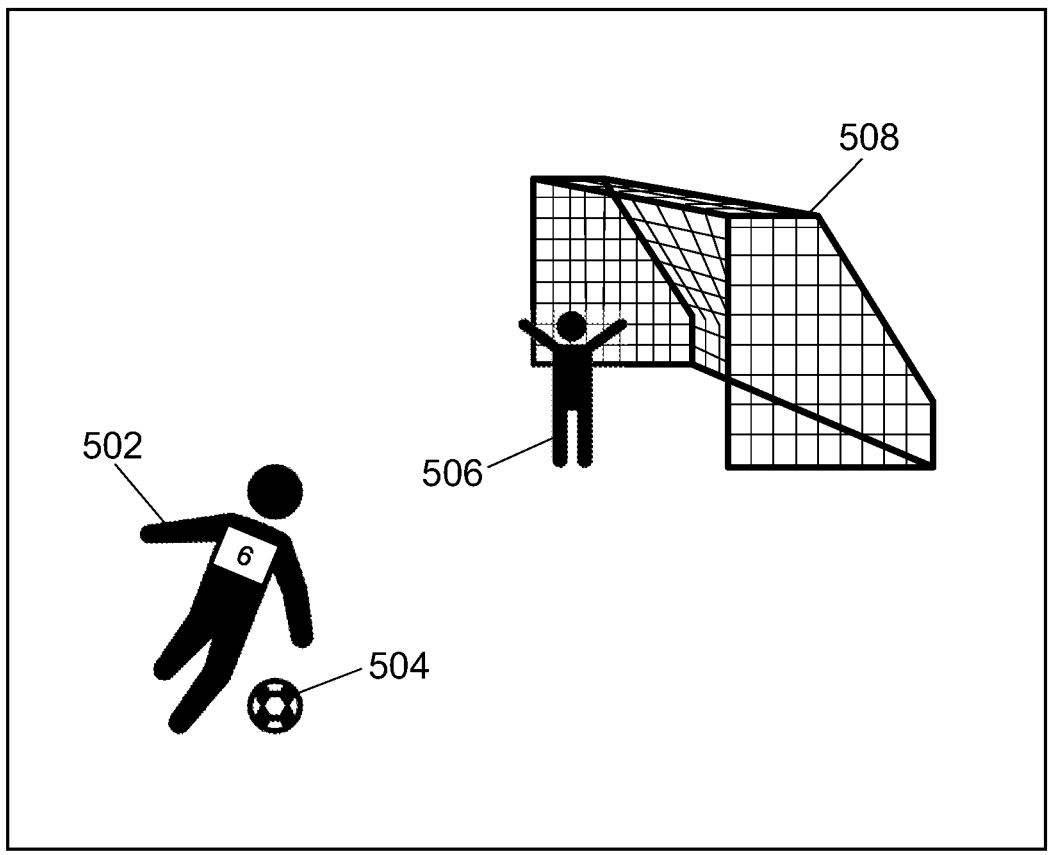
FIG. 7 is a second screenshot of a display screen, in accordance with the first example embodiment.

FIG. 7 shows the event, a video clip, provided to the electronic device appearing on the user interface 500 and on the display of the electronic device. The parameters, randomly generated by the server and forming part of the video clip shown to the user, are that a player 502 with a number 6 jersey attempts a goal. The goal is attempted by kicking a ball 504 with the player's right foot, but the net 508 is missed. A goalie 506 does not need to save the goal.

Some parameters selected by the user matches that of the video clip, and some do not. A goal is not scored, as previously predicted by the user, and the jersey of the player attempting the shot does have an even number, as also previously predicted by the user. However, the player attempts the goal with their right foot, not their head as predicted, and the goal is missed, the goalie does not save the shot. Two of the parameters predicted by the user are therefore correct.

For the two correct estimations, the user will receive a return on their wagers. For the two incorrect estimations, the user will lose their wagers. The correctly predicted "Goal not scored" may return the user's original wager times two, i.e. 20 credits, and the correctly predicted even jersey number may also return the user's original wager times two, i.e. 10 credits. The user will lose the 5 credits wagered on each of the incorrect parameters. As a result, the user's net win on the round may be 5 credits, as they wagered 25 credits, but 30 credits were returned to them.

It will be apparent that a player's returns, or winnings, will depend on the parameters they have accurately selected and predicted, and the odds associated with those parameters. The odds may always be provided to the user at a time of selecting parameters. If, in the example described above with reference to FIG. 6 and FIG. 7, a goal was scored in the event, the user would not win on their prediction of a goal not being scored, or on the way in which the goal was saved. They would still have won on the even number wager as the player attempting the goal was still wearing jersey number 6. The body part would still have been incorrectly selected, and the user would also lose that wager. Then, for the user's 25 credit wager, they would receive 10 credits back, for the wager on the number on the player's jersey. The user's net loss for the round would then be 15 credits. Despite posting a net loss, a player may still feel like they are receiving some return, which may provide an improved experience to a user than if a singular wager was made, i.e. a win/loss only. This may entice the user to continue playing.

In addition, the potential returns to a player may be significant if all parameters are accurately selected. However, it should be noted that the odds of each parameter occurring will impact the return to a user on the specific parameter that is accurately selected.

The fact that actual game footage is used may be particularly interesting to a user, as the user may have a particular interest in the sport or the event itself. The user may even be familiar with the event shown to them, which may further increase their enjoyment of receiving their results in the particular manner.

It should be noted that a user may be allowed to predict what appears to be conflicting parameters. For example, a user may be allowed to select both "goal scored" and "goals not scored". The net effect to the user will be nothing as one of those predicted parameters may need to be true. Their net return may then be zero, regardless of the parameters generated by the RNG. Similarly, a user may select "goal scored", but may select a parameter relating to how a goal was missed. If a goal is scored, the user wins only on the "goal scored" parameter. If the goal is missed, they can still win on the way in which the goal was missed. As a result, a user may wager on events that may appear to be conflicting, however, this may give the user more opportunities to win.

In some embodiments, the event, when played back to a user, may not take up the entire screen of the electronic device. This may be particularly so if a user uses an electronic device in a portrait orientation, while the event (typically a video clip) is provided in a landscape orientation. Then, most, if not all, of the original user interface on which the user placed wagers may be visible whilst the event is also shown. The user interface may highlight the applicable parameters as and when they happen during the event. For example, when a shot is taken with a player's left foot, the applicable parameter may light up. When a goalie saves a shot, the "goal missed" and "saved by goalie" parameters may light up. This may further improve a user's experience, as they will continuously be informed if their selections were accurate. Again, as the user may have placed a multi-factorial wager, the user may continue to feel as if they may win something, even though some of the initial parameters pointed out on the user interface may not have been accurate. In some embodiments, the jersey number parameters may update as the event video clip is played back to the user. For example, player number 3 may pass the ball to player number 7, who may pass the ball to player number 12, who attempts a shot. The indicator may move from the parameter for jersey number 3, to number 7, to number 12 as the ball is passed or handled by the new player. When the shot is taken, a final animation or colour may be applied to the applicable parameter on the user interface. The odd and even number parameters may be similarly updated.

Some embodiments may include multiple shots taken, and in such a case either only the final attempt, or both attempts may be used. Multiple shots may be any number greater than one shot. For example, if a first shot is saved by a goalie, a second shot may be taken shortly after, which may be successful and lead to a goal. Then, only the second shot may be considered for winning purposes. However, it is envisaged that both attempts may be considered, and may even provide a type of bonus round. This may allow a user with more parameters to win, as two different players may take a shot, with two different results. Then, a user may have more chances to win on if, for example, the user selected the parameter that a goal was scored. Even if the first attempt was saved by a goalie, the second attempt may be successful, and the user's wager may be successful. Similarly, if a first shot was taken by a player with an odd number jersey, and the second by a player with an even number, the user may be successful irrespective of whether they chose the odd or even number parameter. Additionally, if two shots were taken by a player with an even numbered jersey, the user's winnings may be doubled should they have wagered on the parameter for an even numbered jersey taking a shot. Appropriate animations, for example a selection lighting up on the user interface, may then show a potential win for each of the multiple shots taken.

While the odds provided with each possible parameter may be static, i.e. for each wager made by a user it remains the same, it is envisaged that the odds may be updated during gameplay or over an extended period of operation of the systems and methods, although this may need to be pointed out to a user. This may be as a result of, for example, game stats changing significantly in a particular season or of a specific league of sports. Then, the odds may be updated to accurately reflect or mirror odds during such season or league, particularly if the events are all taken from that league.

The odds offered to a user may be configured such that an operator of the game may expect at least some return. As a result, a return to player (RTP) value may be incorporated into the systems and methods, which may be communicated to a player as required by law, regulation, or operator preference.

A user may be allowed to select not only a type of sport and a type of event, but also a league from which event in the form of video clips are to be taken. As an example, a user may wish to view events from a South American football league, as this may be of particular interest to them. Other users may choose to view events relating to European leagues, or specific European leagues, as those may be of interest to them.

It is envisaged that multiple different types of events, and in particular events dealing with different types of sport, all may be selectable by a user. Then, a user may select the type of event, sport, or events within a sport, they wish to predict parameters of. It should be noted that the type of event and/or sport will impact the possible parameters available to a user. For example, cricket could be one such sport. Then, each event may be a delivery bowled by a bowler to a batsman. Possible parameters may include, but need not be limited to, whether the delivery leads to a dismissal or not, a way in which a dismissal occurs (for example caught, bowled, stumped, leg before wicket, run out or obstructing the field), the number of runs scored from the delivery (for example, one to six), or whether extras were scored, and in which way (for example byes, leg byes, wides, no balls, or over throws).

For the sport of basketball, events may relate to an attempted shot. Possible parameters may relate to whether a basket was scored or not, the value of the basket made, the number of the jersey of the player that made the shot, and a type of violation that occurred during the attempted shot (for example charging, kicking, palming, double dribbling, or a three second violation.

For the sport of ice hockey, events may relate to a goal scoring event. Possible parameters may relate to whether a goal was scored or not, a type of penalty (for example misconduct, match, minor, major, or is a penalty shot was awarded), the player's jersey number, and infractions that may have occurred (for example hooking, tripping, slashing, delay of the game, or cross checking).

When the present systems and methods are incorporated into a wager-based system, a user that wishes to place a wager on the estimation of specific parameters may need to establish a credit balance in an account that allows them to take part in the systems and methods. This may be, for example, the provision of a physical item that represents a monetary currency in a dedicated gaming machine, credit card details allowing an operator of the systems and methods to retrieve money for play of the game, an account associated with the operator or being accessible by the operator from which a credit value may be used, or the like. It is envisaged that, in the event of a user winning after a wager, payment of the user's winnings may be made into such account or may be paid out in any other suitable format. Processing a result may include processing any winnings to the user's account.

Figure 8:
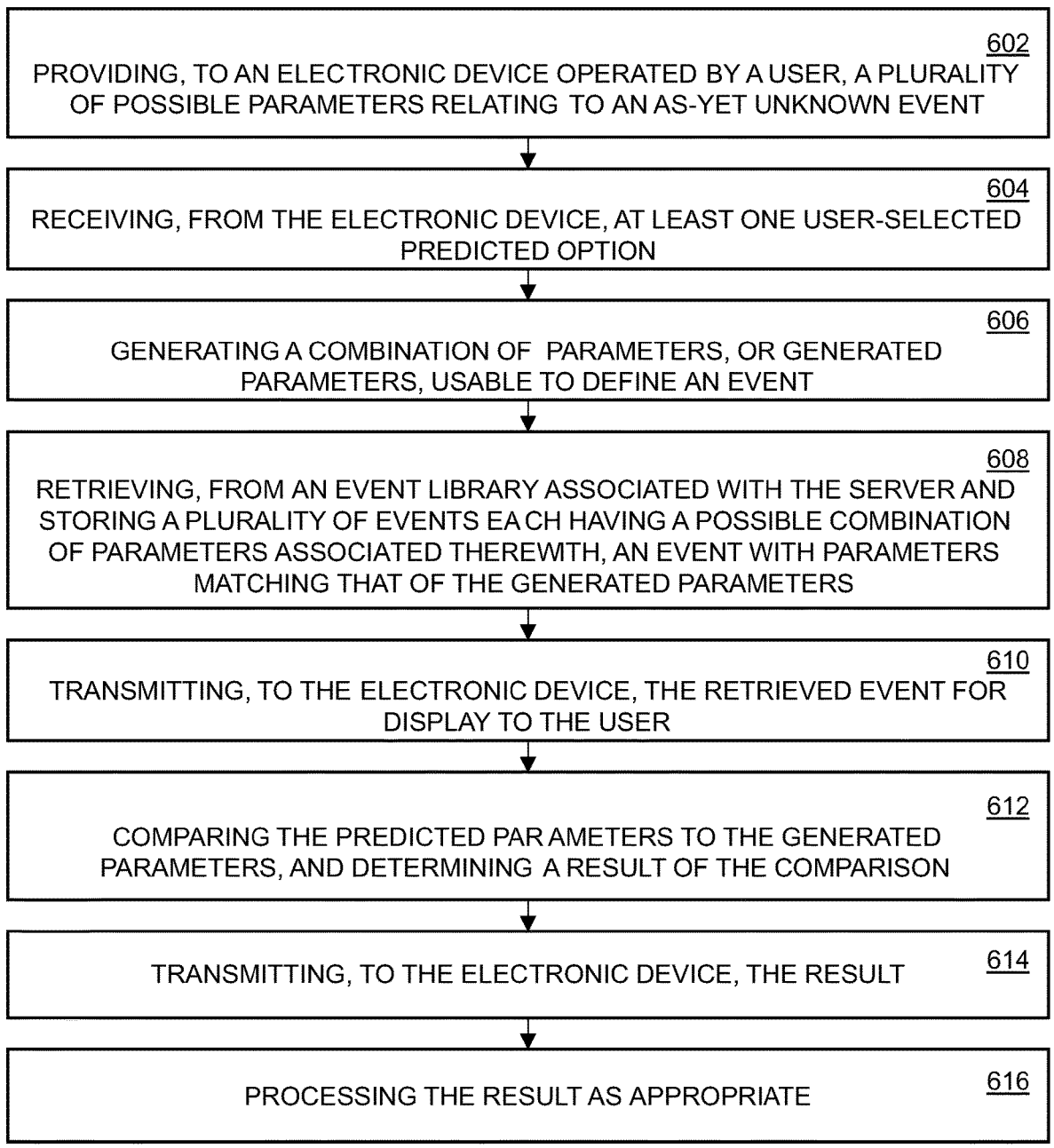
FIG. 8 is a flowchart, in accordance with example embodiments.

FIG. 8 depicts a flowchart showing the operations of a method 600 that can, for example, be carried out using server 102. It is noted that the functionality described in connection with the flowchart can be implemented as special-function and/or configured general-function hardware modules, a computer program or portions of program code executed by a processor for achieving specific logical functions, determinations, and/or steps described in connection with the flowchart shown in FIG. 8. Where used, program code can be stored on any type of computer-readable medium, for example, such as a storage device including a disk or hard drive.

In addition, each block of the flowchart shown in FIG. 8 may represent circuitry that is wired to perform the specific logical functions in the process. Unless specifically indicated, functions in the flowchart shown in FIG. 8 may be executed out of order from that shown or discussed, including substantially concurrent execution of separately described functions, or even in reverse order in some examples, depending on the functionality involved, so long as the overall functionality of the described method is maintained.

Block 602 includes providing, to an electronic device operated by a user, a plurality of possible parameters relating to an as-yet unknown event.

Block 604 includes receiving, from the electronic device, at least one user-selected predicted parameter.

Block 606 includes generating a combination of parameters, or generated parameters, usable to define an event. The event may be a video clip of a recorded episode, for example a sporting episode.

Block 608 includes retrieving, from an event library associated with the server and storing a plurality of events each having a possible combination of parameters associated therewith, an event with parameters matching that of the generated parameters.

Block 610 includes transmitting, to the electronic device, the retrieved event for display to the user.

Block 612 includes comparing the predicted parameters to the generated parameters and determining a result of the comparison.

Block 614 includes transmitting, to the electronic device, the result, and block 616 includes processing the result as appropriate.

IV. Additional Example Embodiments

Figure 9:
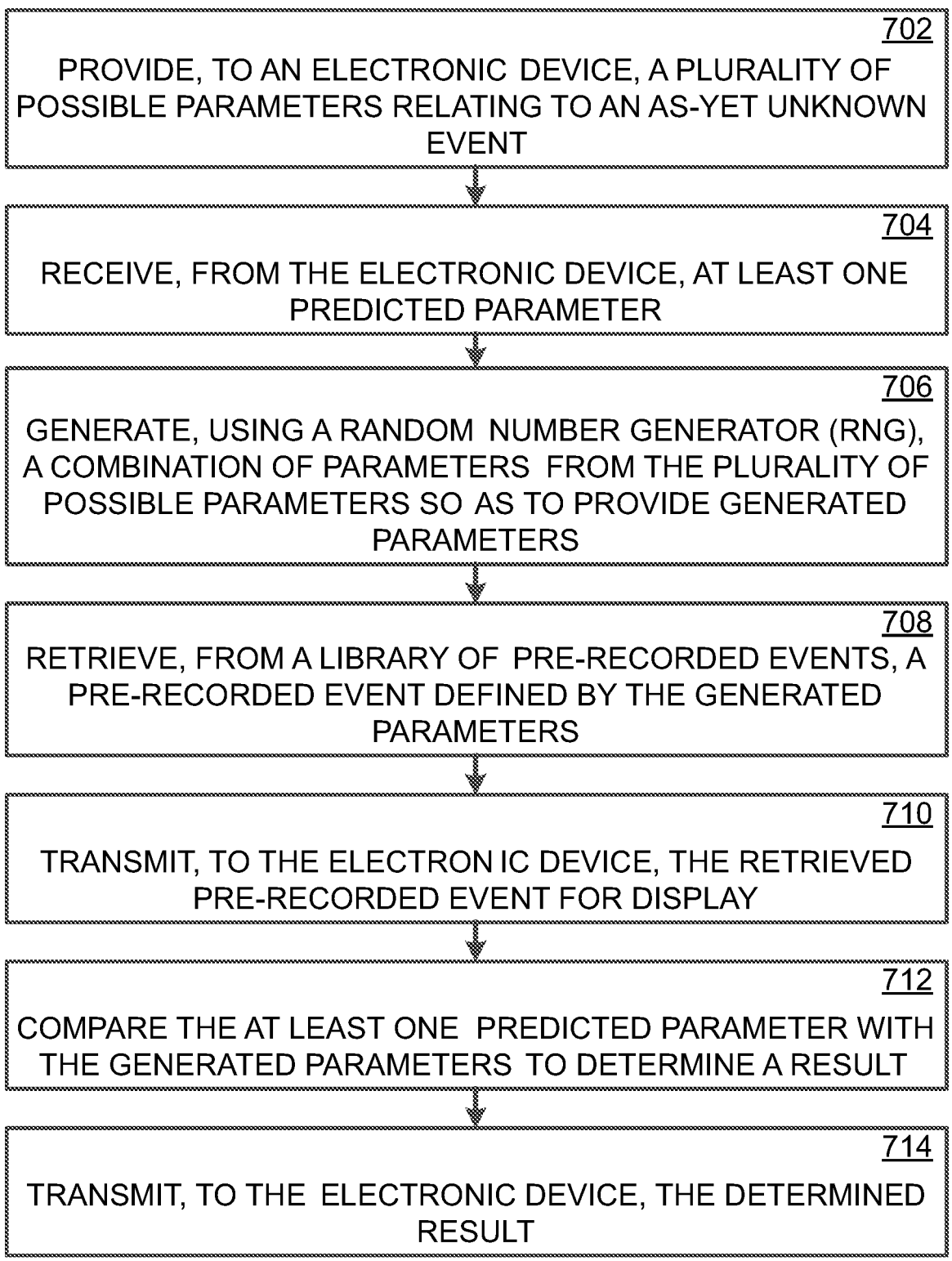
FIG. 9 is another flowchart, in accordance with example embodiments.

FIG. 9 depicts a flowchart showing the operations of a method 700 that can, for example, be carried out using the server 102. It is noted that the functionality described in connection with the flowchart can be implemented as special-function and/or configured general-function hardware modules, a computer program or portions of program code executed by a processor for achieving specific logical functions, determinations, and/or steps described in connection with the flowchart shown in FIG. 9. Where used, program code can be stored on any type of computer-readable medium, for example, such as a storage device including a disk or hard drive.

In addition, each block of the flowchart shown in FIG. 9 may represent circuitry that is wired to perform the specific logical functions in the process. Unless specifically indicated, functions in the flowchart shown in FIG. 9 may be executed out of order from that shown or discussed, including substantially concurrent execution of separately described functions, or even in reverse order in some examples, depending on the functionality involved, so long as the overall functionality of the described method is maintained.

Block 702 includes providing, to an electronic device, a plurality of possible parameters relating to an as-yet unknown event. The electronic device may be a smartphone, a laptop computer, a wearable computing device, a handheld gaming device, a gaming system, a standalone gaming device, or another type of device.

The electronic device can communicate with one or more servers using wireless communication to obtain the parameters. In some instances, the electronic device may transmit a request within a communication packet to a server. The reception of the request may cause the server to obtain and provide a set of possible parameters to the electronic device.

Block 704 includes receiving, from the electronic device, at least one predicted parameter. For instance, the server may receive a set of predicted parameters from the electronic device.

Block 706 includes generating, using a random number generator (RNG), a combination of parameters from the plurality of possible parameters so as to provide generated parameters.

Block 708 includes retrieving, from a library of pre-recorded events, a pre-recorded event defined by the generated parameters. The server may include one or more event libraries. Each event library may include content corresponding to one or more categories of pre-recorded events, such as sports, media (e.g., television shows, movies, video games), and/or life-events (e.g., gender reveals, weddings), among other possible content.

Block 710 includes transmitting, to the electronic device, the retrieved pre-recorded event for display. In some examples, the server may transmit additional information to the electronic device associated with the retrieved pre-recorded event, such as statistics, text, images, and/or other content.

Block 712 includes comparing the at least one predicted parameter with the generated parameters to determine a result. The server may perform the comparison to determine which predicted parameters match the generated parameters. This way, the server may identify whether any of the wagers placed by a user of the electronic device were correct. As such, the result may indicate an overall win or loss associated with the game round.

Block 714 includes transmitting, to the electronic device, the determined result. This enables the electronic device to display the results of the game round to the user.

In some examples, the method 700 may further involve processing the determined result to determine an overall payout for the user of the electronic device.

Figure 10:
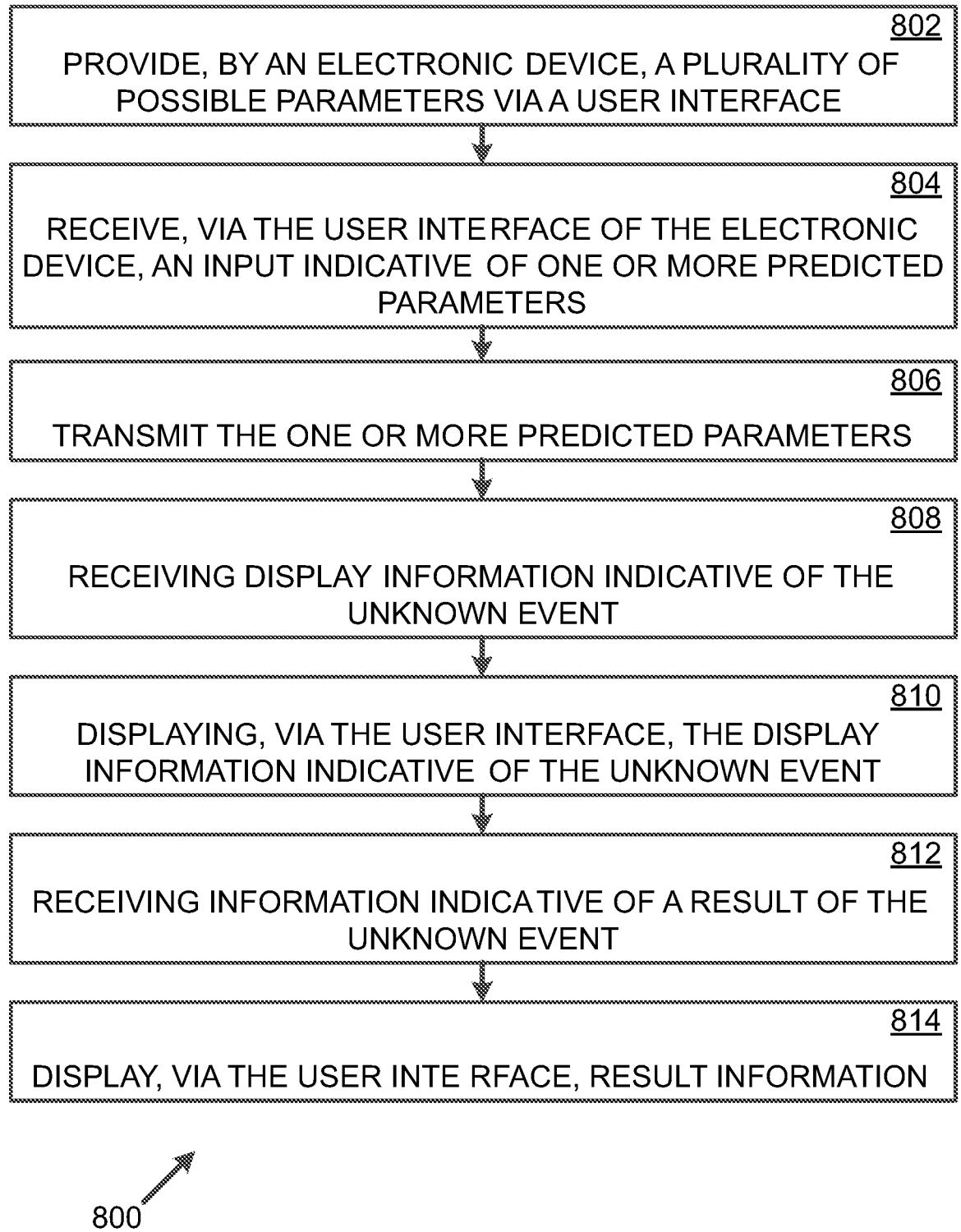
FIG. 10 is an additional flowchart, in accordance with example embodiments.

FIG. 10 depicts a flowchart showing the operations of a method 800 that can, for example, be carried out using the electronic device 152. It is noted that the functionality described in connection with the flowchart can be implemented as special-function and/or configured general-function hardware modules, a computer program or portions of program code executed by a processor for achieving specific logical functions, determinations, and/or steps described in connection with the flowchart shown in FIG. 10. Where used, program code can be stored on any type of computer-readable medium, for example, such as a storage device including a disk or hard drive.

In addition, each block of the flowchart shown in FIG. 10 may represent circuitry that is wired to perform the specific logical functions in the process. Unless specifically indicated, functions in the flowchart shown in FIG. 10 may be executed out of order from that shown or discussed, including substantially concurrent execution of separately described functions, or even in reverse order in some examples, depending on the functionality involved, so long as the overall functionality of the described method is maintained.

Block 802 involves providing, by an electronic device, a plurality of possible parameters via a user interface. The plurality of possible parameters may relate to an unknown event. In some examples, the electronic device may be a smartphone, a laptop computer, a wearable computing device, a handheld gaming device, a gaming system, or a standalone gaming device. The unknown event may correspond to one or more of a sporting event, a gender reveal event, a news event, a television show, a movie, a video game, and a general activity.

Block 804 involves receiving, via the user interface of the electronic device, an input indicative of one or more predicted parameters. In some examples, receiving the input may involve receiving a wager corresponding to the one or more predicted parameters. A value of the wage may be between a minimum value and a maximum value. One or both of the minimum and maximum values may depend on the unknown event, such as a type of the unknown event.

Block 806 involves transmitting the one or more predicted parameters. In some examples, the electronic device may transmit the one or more predicted parameters to a server (e.g., the server 102).

Block 808 involves receiving display information indicative of the unknown event. In some examples, the electronic device may receive display information indicative of the unknown event from the server (e.g., the server 102).

Block 810 involves displaying, via the user interface, the display information indicative of the unknown event. In some examples, the electronic device may display one or more images, background information, maps, statistics, videos, multimedia, and/or text corresponding to the unknown event.

Block 812 involves receiving information indicative of a result of the unknown event. For instance, the information may include content, such as one or more video clips, statistics, images, text, and/or other types of content that may convey the result of the unknown event.

Block 814 involves displaying, via the user interface, result information. The result information may be based on a comparison between the one or more predicted parameters and the result of the unknown event. The result information may include a summary of the game round, which may include an overall success rate of the user's selections.

In some examples, the electronic device is communicatively coupled to a server to enable communication between the electronic device and the server. For instance, the electronic device may receive the plurality of possible parameters from the server. The server may include one or more event libraries that are configured to store the information indicative of the result of the unknown event.

To illustrate an example, the electronic device may provide an option for a user to select a type of unknown event from different categories of events. This may enable the user to select an event for the game from various available event types, such as a sporting event, a gender reveal event, a reality television show, a movie, or some other type of unknown event.

The electronic device may receive an input specifying a selection of a particular sport (e.g., soccer) and subsequently provide a plurality of possible parameters via a user interface. For example, the electronic device may provide a static betting board that includes bet types, such as "goal", "no goal", "player number that scored", and other potential bets that may or may not occur during a soccer game. The betting board may be designed in conjunction with a math model designed to balance fun for the user and margin.

The electronic device may receive wagers via the static betting board enabling the game to transition from a betting phase to an anticipation phase. The anticipation phase may be used to build up excitement for the user as various elements about an upcoming event is revealed. For example, the electronic device may display teams competing in the soccer match. Once the details are shown, the electronic device may transition to the outcome phase, which may involve displaying a video clip of the soccer match or another display that indicates whether the user has won or lost based on the wagers placed with respect to the static betting board.

In some instances, the electronic device may display a video clip that lasts between 15 to 30 seconds or another length dependent on the game type or type of action. For example, the electronic device may display a simple goal video clip that includes some build up play, the goal itself, player celebration, and finally a replay of the goal. In another example, the electronic device may display an offside that contains similar action but additional footage of the players arguing with the referee or challenging the decision. Other elements of a soccer match may be shown too within example video clips.

In addition, the electronic device may further provide a summary to the user. The summary may indicate the betting outcome for the game round and may enable the user to navigate back to the betting board to play another round. The user may select to play another game involving soccer or a different type of event.

Figure 11:
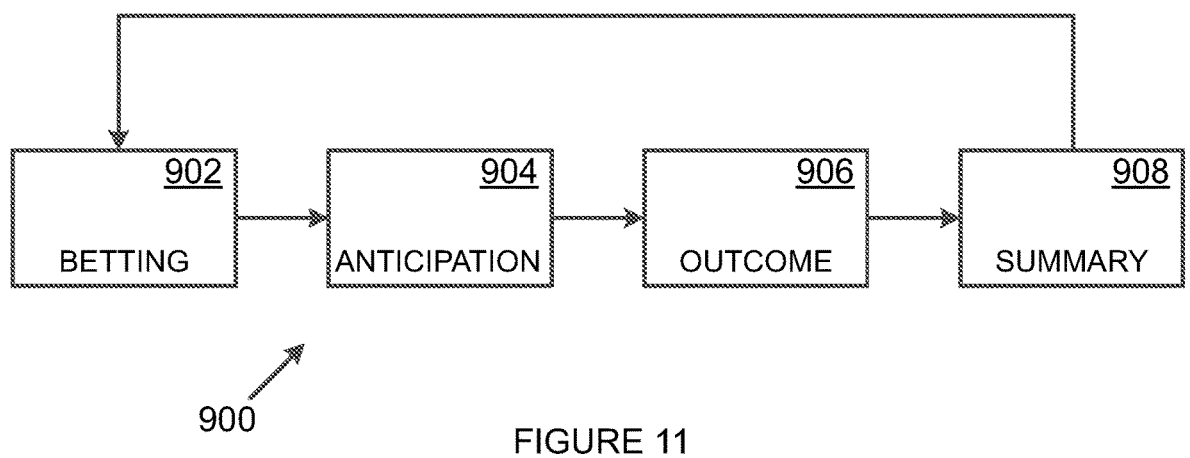
FIG. 11 is a simplified view of a game flow, in accordance with example embodiments.

FIG. 11 depicts a simplified view of a game flow, according to example embodiments. The game flow 900 includes four different phases arranged in a linear order. The four phases may be performed sequentially with each phase concluding prior to the start of the next phase. The performance and completion of the four phases in numerical order may be one round of the game. The four phases may be performed immediately after the completion of the prior or with a delay between phases. In some examples, performance of two or more phases can overlap.

As shown, the game flow 900 may begin with the betting phase 902. An electronic device may provide a set of possible parameters via a user interface during the betting phase 902. The electronic device may be communicatively coupled to a server and may receive the set of possible parameters from the server. In addition, the electronic device may also receive an input via the user interface. The input may be indicative of one or more predicted parameters.

In some examples, the start of the betting phase 902 may involve the electronic device initially providing a category selection option via a user interface. The category option may enable a user to select a category for the game from multiple categories of unknown events. For instance, the category option may present one or more options to the user, such as sports, movies, television, news events, video games, and general activities. This enables the user to choose gameplay based on a desired category of unknown event. The electronic device may receive a selection of an option via the user interface and transmit the selection to the server. In turn, the server may provide a set of possible parameters based on the selected category to the electronic device. This way, the game round can be customized based on the preferences of the user.

In some examples, the betting phase 902 enables touch-interaction by the user to place wagers on betting options. Particularly, the electronic device includes a touchscreen interface that enables the user to push, drag and drop, and otherwise interact with the available betting options. The electronic device can further illuminate light emitting diodes (LEDs) and trigger sound effects and other audio in response to the touches detected from the user. This can increase the immersion of the user within the gameplay.

The next phase in the game flow 900 is the anticipation phase 904. The anticipation phase 904 may occur in response to the electronic device receiving the input via the user interface during the betting phase 902. For example, the electronic device may receive the input during the betting phase 902 and transmit the predicted parameters to the server. During the anticipation phase 904, the electronic device may receive and display, via the user interface, display information indicative of an unknown event.

The electronic device may receive the display information displayed during the anticipation phase 904 from the server. In particular, the server may generate a combination of parameters from the set of parameters so as to provide generated parameters. For instance, the server may use a random number generator (RNG) to generate the combination of parameters from the set of possible parameters. The server may then retrieve a pre-recorded event defined by the generated parameters from a library of pre-recorded events and transmit the retrieved pre-recorded event to the electronic device for display.

Example content stored in a library of pre-recorded events can include various categories of events, such as life events (e.g., gender reveal, weddings), sports, video games, movies, television, and weather conditions, among others. The content can be organized based on category and further organized into subcategories based on particular aspects of each event, such as the location of the event, date when the event occurred, outcome, and quantity of participants, among others. The content may be analyzed and parsed such that a searching module could identify content based on various parameters, such as the quantity of participants, the outcome, the time of day, the location, etc. In some examples, the searching module can identify content stored within the library that meets multiple criteria (e.g., an event at a particular location with at least five participants and in a video format).

In an example embodiment, content is associated with a library via an automatic process. An ANN, for example, can be trained to generate video clips based on the real-time airing of a sporting event or another type of event. To illustrate, as a baseball game plays on television, the ANN can use a buffer to identify and playback segments of the game that include events (e.g., homeruns, stolen bases, and spectacular defensive plays) that can be used to make video clips for gameplay. The ANN can associate tags with each video clip to make the video clip searchable in one or more ways, such as based on location, team, type of event, outcome, and/or other ways. In some examples, other types of processes may be used, such as machine learning and computer vision.

In some embodiments, the betting phase 902 overlaps at least part of the anticipation phase 904. For example, the electronic device may enable bets to be placed during an initial portion of a video clip via touching features within the video clip. For instance, a user may select a particular runner in a race when all the runners are lining up by touching the particular runner within the GUI.

After the anticipation phase 904, the game flow 900 may involve the outcome phase 906. The outcome phase 906 may involve the electronic display receive information indicative of a result of the event and display result information. For instance, the result information may include a video clip showing the outcome of the unknown event.

The summary phase 908 follows and may involve the electronic device displaying the betting outcome for the game round. For instance, the electronic device may display result information that is based on a comparison between the parameters predicted by the player and unknown event. The summary may identify winning and losing wagers for the user and may also indicate a total win or loss for the game round. In some instances, the electronic device may further specify other information during the summary phase 908, such as an indication of an overall winning streak associated with the user's participation.

Figure 12:
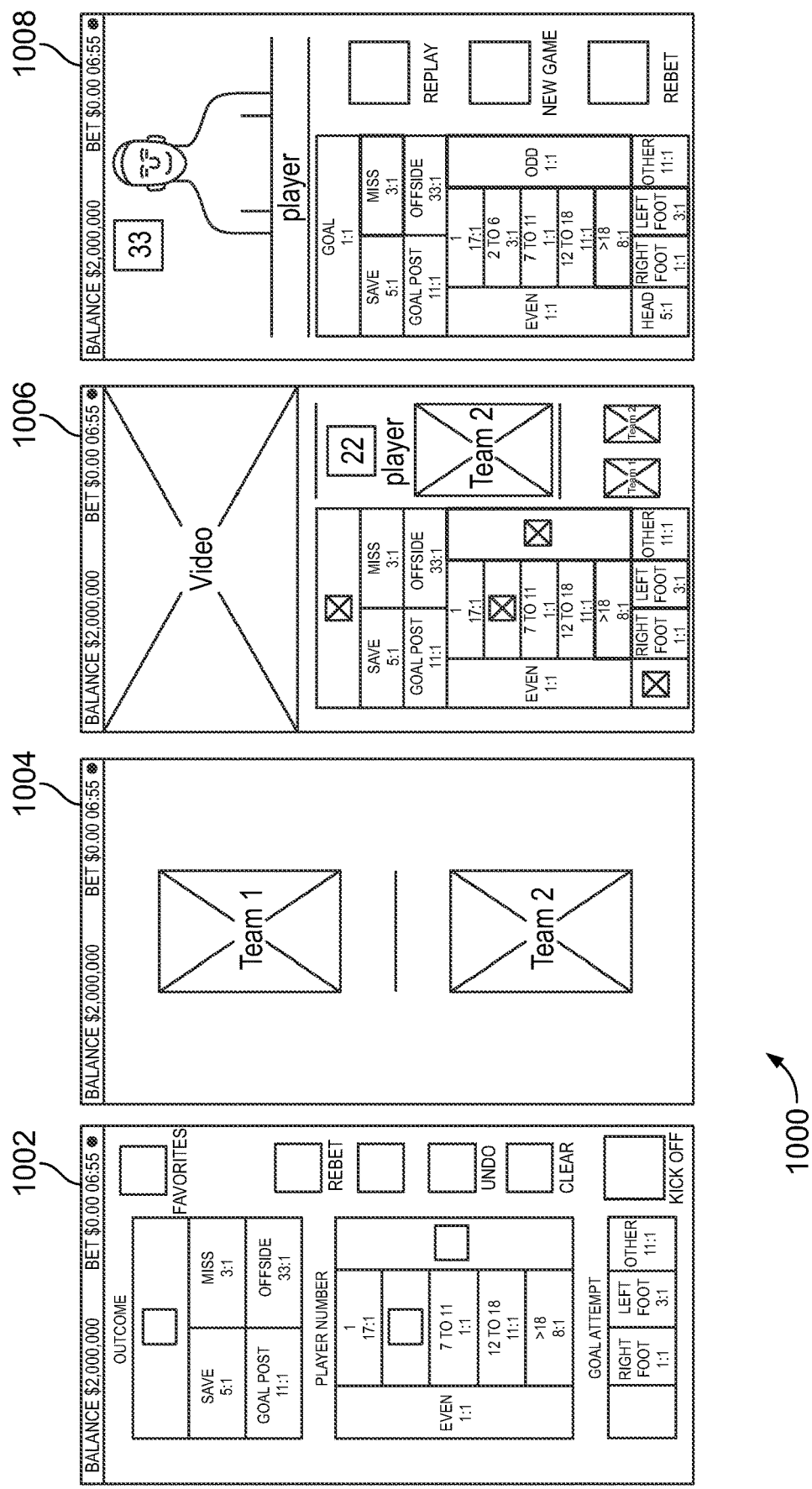
FIG. 12 depicts graphical user interfaces that an electronic device may display during gameplay, in accordance with example embodiments.

To further illustrate, FIG. 12 depicts graphical user interfaces (GUIs) that an electronic device may display during the game flow for a soccer-match game round. During the betting phase 902, the electronic device may display GUI 1002. The GUI 1002 includes a betting board with various soccer-related betting options that can be selected by a user. Particularly, the electronic device may display the GUI 1002 to enable the user to submit wagers on different actions that the user hopes may happen during performance of a soccer clip. The different betting options may be provided as a set of possible parameters by a server.

The server may use the set of possible parameters to generate a combination of parameters from the set of possible parameters. As indicated above, the combination of parameters can be used to retrieve a pre-recorded event from a library of pre-recorded events and transmit the pre-recorded event for display at the electronic device. In particular, the electronic device may receive and display, via a user interface, display information, such as the GUI 1004. The GUI 1004 includes indications of the teams participating in the upcoming soccer event that the user may have wagered on via the GUI 1002.

Next, the electronic device may display the GUI 1006, which includes a video clip of the outcome of the soccer event. For the soccer event depicted in the example, the video clip shows a player missing a scoring attempt. The electronic device may subsequently display the GUI 1008 that shows result information. The result information indicates whether the user won or lost different betting options selected. The GUI 1008 shows that player 33 with the last name "Jesus" missed a shot on goal using his right foot.

In addition, the GUI 1008 also shows options for the user to select, such as a replay option, a new game option, and a rebet option. The replay option may cause the electronic device to replay the video clip showing the outcome of the soccer event. The new game option causes the electronic device to return to the betting phase. In some instances, the new game option may cause the electronic device to return to the betting phase for the same category of event, such as another soccer event. The rebet option may enable the user to return to the betting phase with the bets from the prior round included.

Figure 13:
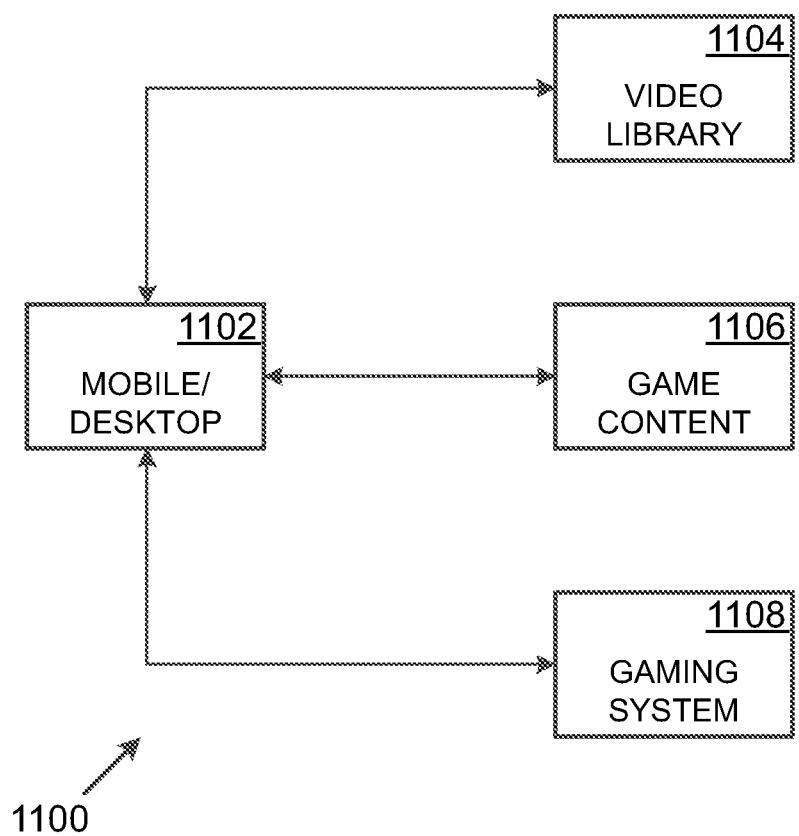
FIG. 13 depicts an architecture arrangement for enabling gameplay, in accordance with example embodiments.

FIG. 13 depicts an architecture arrangement for enabling gameplay, in accordance with example embodiments. As shown, the architecture arrangement represents an example arrangement of components that can enable gameplay and includes a mobile/desktop 1102, a video library 1104, game content 1106, and a gaming system 1108. Other examples may include more or fewer components in different arrangements.

The gameplay enabled by the architecture arrangement 1100 may include media generated for each game type for various genres, such as sports, movies, television, and other activities. The mobile/desktop 1102 may provide a client for the game and use traditional game content 1106 (e.g., PNGs, HTML, configuration, JavaScript) to deliver the user interface and mix in clips from the video library to deliver the full game experience.

The video library 1104 may contain a large set of outcome video clips and may be able to add additional content over time. For instance, new video clips and/or other content may be added after each soccer match.

The gaming system 1108 may be used to calculate a result of the game round and therefore may define the video clip (or content) that will be displayed to the user in the client.

FIG. 14 depicts a user interface of possible parameters, in accordance with example embodiments. To satisfy all combinations within a game, a system may be configured to provide at least one video clip for each unique result. The graphical user interface 1200 represents an example soccer betting board that would require at least 100 unique videos. With 100 unique videos, if the results were evenly distributed, there is a one percent chance that the next bet could result in the same video being played again. To minimize repeating videos within a small number of game rounds, the system may use a math model (e.g., a RNG) to select videos. In addition, each game may attempt to resemble the sport or activity that the game is based on. For example, in soccer, it is substantially more likely that a player with number 9 to score a goal using a right foot kick than a goalkeeper scoring a goal with a header. As such, the math model associated with the game may attempt to reflect these likelihoods as well as other likelihoods associated with the sport. As a result, the system may display certain clips more often than others. Therefore, some clips may have higher possibilities of being displayed again on the next bet.

In addition, the system may be configured to ensure that the games are relevant for the categories. For instance, the system may obtain video clips and other content from the latest matches to keep the library of video clips and content current. In some examples, the system may obtain and display information about aspects of the game, such as facts about the players or other participants, schedules, upcoming games or shows, statistics, and team records, etc. The system may obtain the information from databases, web applications, and/or other sources.

In additional examples, the system may also display links to purchase merchandise, tickets, and/or other items or services with respect to a game. For example, the system may provide links to purchase jerseys of players shown in the soccer clip and/or tickets for the team's upcoming games.

Figure 15:
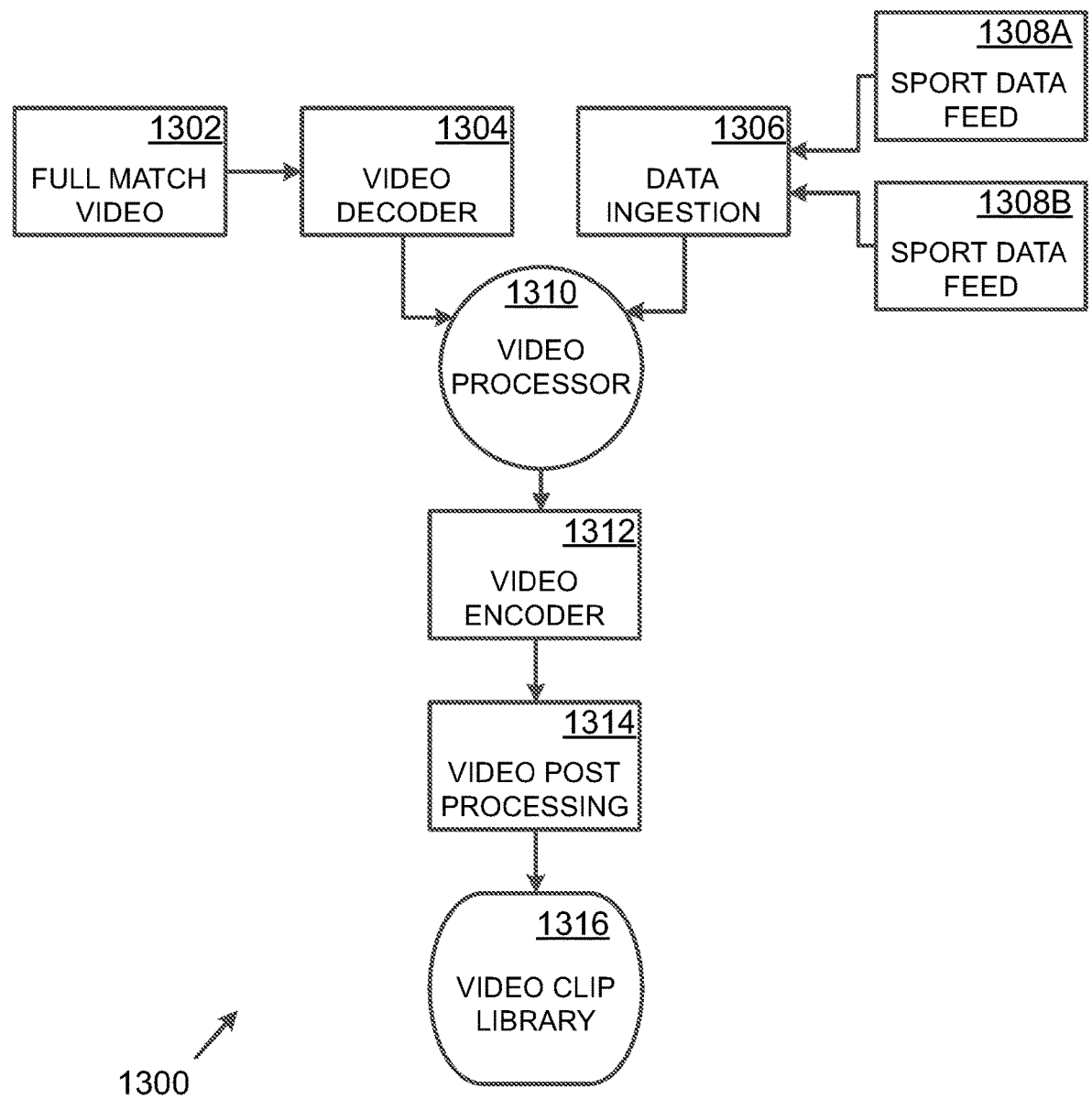
FIG. 15 depicts a content generation process, in accordance with example embodiments.

FIG. 15 depicts a content generation process, in accordance with example embodiments. The content generation process 1300 includes steps arranged such that performance of the steps can automatically increase the content available for game categories, such as new video clips of sporting events. In other examples, the content generation process 1300 may include more or fewer steps in other arrangements. As shown, the content generation process 1300 involves full match video 1302, video decoder 1304, data ingestion 1306, sport data feed 1308A, 1308B, video processor 1310, video encoder 1312, video post processing 1314, and video clip library 1316.

The content generation process 1300 may use multiple inputs, such as the full-length match video 1302 and one or more sport data feeds 1308A, 1308B. A system may parse, combine, and process the sport data feed(s) 1308A, 1308B into a list of start and end times for clips that could be used for the game, which may involve a video decoder 1304 and/or data ingestion 1306. The content generation process 1300 may process the full match video 1302 using a video processor 1310 and determine highlight video clips using a video encoder 1312. The highlight videos may be passed to post processing 1314 where each clip could be evaluated, enhanced, and chosen to be added to the video clip library 1316.

Figure 16:
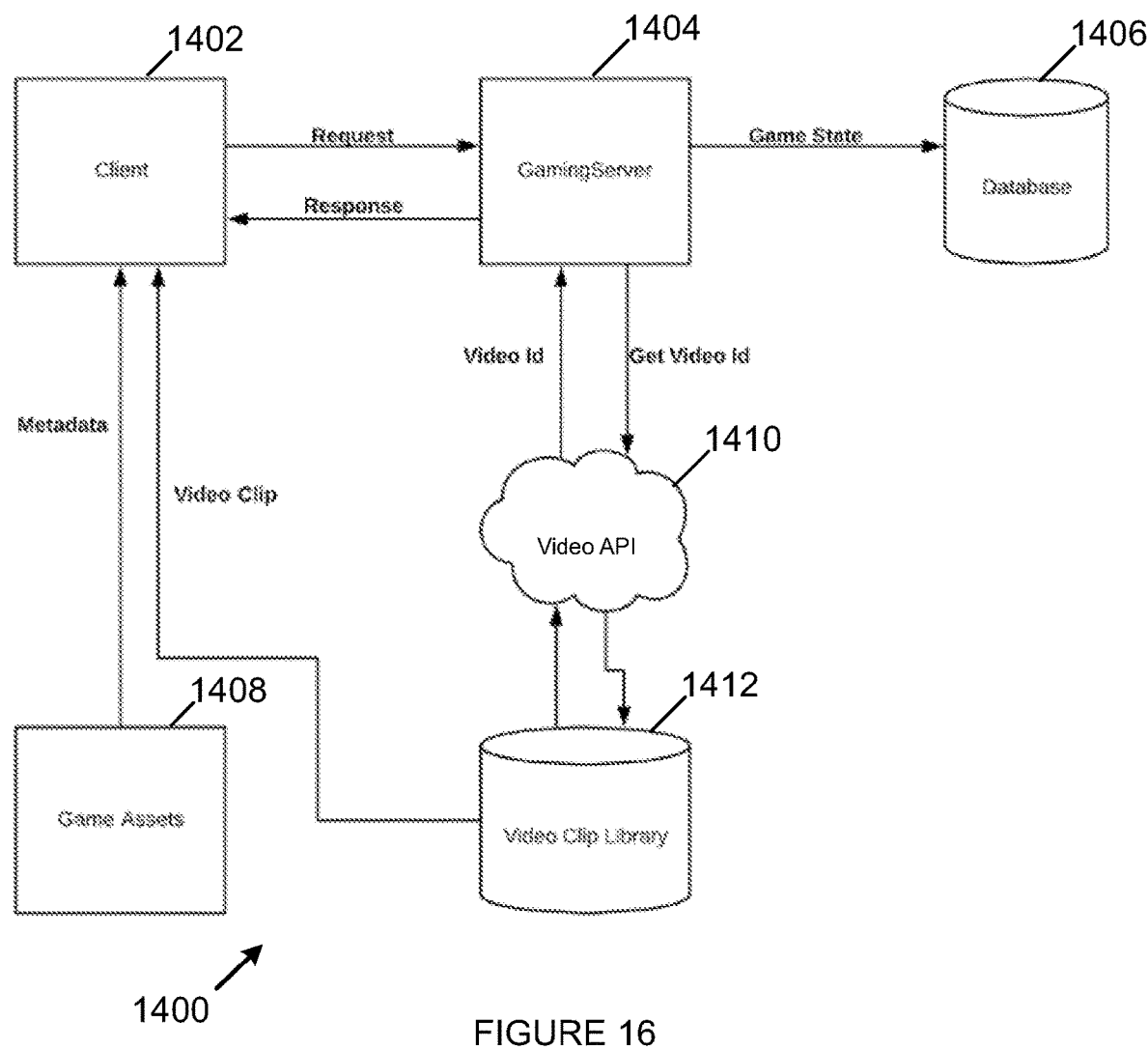
FIG. 16 depicts a system for displaying content, in accordance with example embodiments.

FIG. 16 depicts a system for displaying content, in accordance with example embodiments. The client 1402 may submit a betting request to the gaming server 1404. In response to the betting request, the gaming server 1404 may calculate a result set for the bet. Particularly, the result set may include the outcome, player number, and goal attempt. In some examples, the gaming server 1404 may use a RNG to calculate the result set for the bet. The gaming server 1404 may also transmit a game state to a database 1406.

Using the result set, a video API 1410 may be queried by the gaming server 1404 to find matching videos (or content) from the video clip library 1412 and filter the entire list of videos down to only those that have math that match the result set for this request. If there are a high number of videos available for this request, the video API 1410 may also use a strategy to select the most appropriate video for the event. The strategy may involve a random selection of a single video clip of the filtered list. In some examples, the strategy may prioritize the location of the user such that a video clip from the location of the user is more likely selected. This may make it more likely that video clips from countries that the user is from are more likely shown. In addition, the strategy may also deprioritize previously seen video clips and deprioritize videos with teams that have been previously been shown to the user. This can reduce the likelihood that the user sees the same video clip in a short duration.

The video API 1410 may send the identification number for the video that will play to the gaming server 1404. The gaming server 1404 may then send back the result as well as the identification number for the video that can be played in the response packet. The client 1402 may be able to display the video clip and all associated information as a result. In some instances, the video clip may be transmitted to the client 1402 by the video clip library 1412. In addition, the client 1402 may use game metadata received from the game assets 1408.

As shown, the game may use unique requirements where the video content needs to be queried by the gaming service such that additional videos could be made available periodically. The client 1402 may utilize different ways to display a single result set that can be updated. The result that the client 1402 displays may be persisted per user transaction to enable the user to view historical results.

To illustrate, for a soccer game, the client 1402 can identify and choose a video based on one or more factors, such as the outcome (e.g., goal, save, miss, goal post, or offside), player number (e.g., even or odd as well as 1, 2 to 6, 7 to 11, 12 to 18, and more than 18), and goal attempt (e.g., head, right foot, left foot, other). These axes of results can cater for the mathematical modelling of the game. In some instances, the axes may limit the number of videos that involve a particular number (e.g., a goal scored by a number 7 using their right foot) driven by and stored on the server. As a result, the system may be configured to add content to the game without releasing a gaming server 1404 update as discussed above.

FIG. 17 depicts video metadata, in accordance with example embodiments. When playing a video clip that was selected for a result, the client may use other pieces of information. These other pieces of information may be vital for displaying content in the form of static images and video. For instance, the soccer game may include information, such as the player name, player number, team for, team for league, team for country, team against, team against league, and team against country, etc. The system may use metadata (e.g., JSON formatted) that can be hosted as part of the static content. The client may load the video metadata file upfront (e.g., when initially loading the game). When a video result is available and prepared for being played, the appropriate metadata may be selected by matching the video name returned in the gaming server response to the filename available in the metadata.

Figure 18:
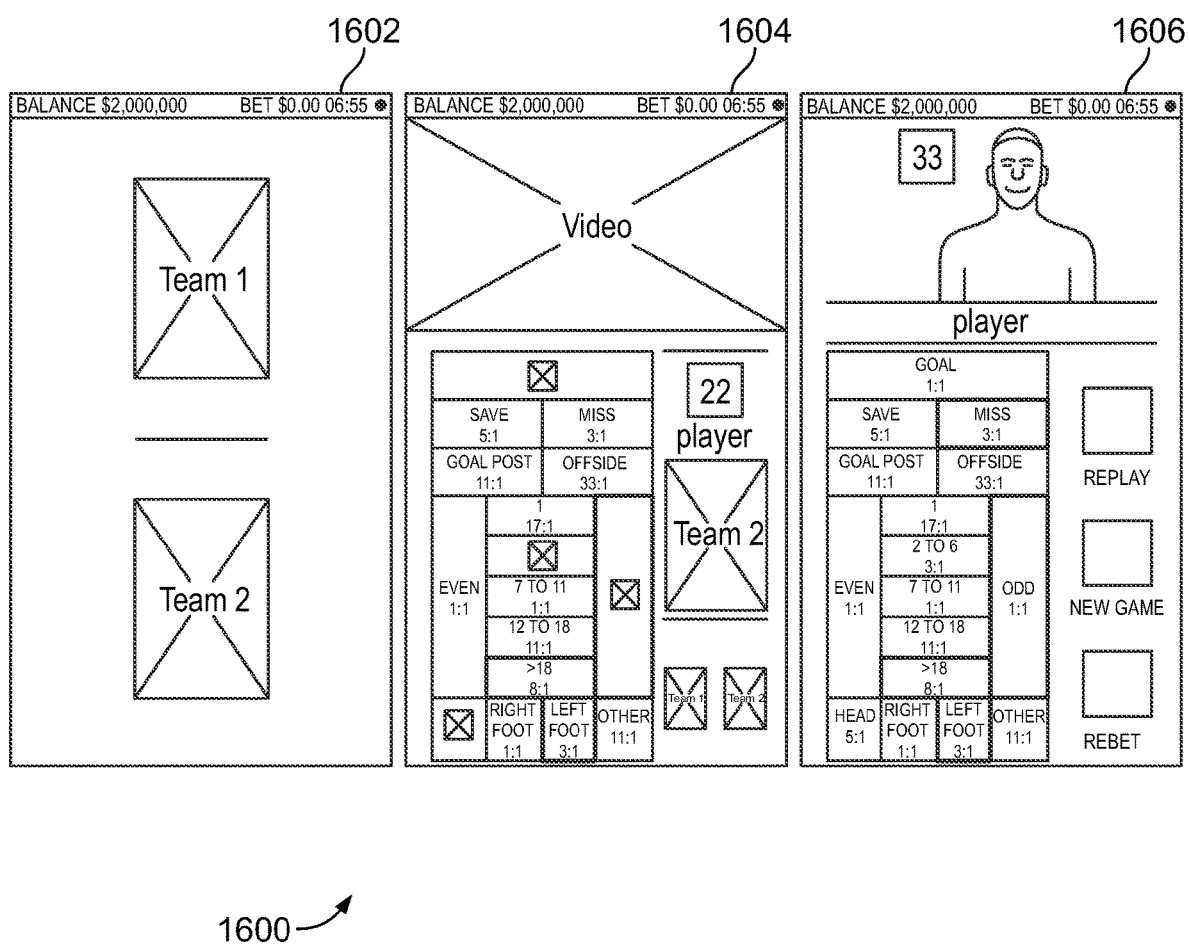
FIG. 18 shows graphical user interfaces, in accordance with example embodiments.

As such, FIG. 17 shows example soccer video clip metadata snippet 1500. The example metadata includes definitions for the teams playing each other and details of the player who the outcome is based on. This can include information that may display as text fields as well as contain associations to images contained in the game assets. All this information and assets could combine in the game client into interfaces such as a set of graphical user interfaces 1600 shown in FIG. 18. In particular, FIG. 18 shows GUI 1602, GUI 1604, and GUI 1606 that each include metadata related to the soccer clip. GUI 1602 shows the teams participating in the upcoming video clip. GUI 1604 shows the video clip along with the betting board including any bets that the user placed. GUI 1606 shows the outcome of the video clip, including which player was focused on within the video clip.

In some examples, the metadata section of the JSON file may vary from game to game depending on the sport type. For instance, the metadata may depend on whether the game is team or individual based and whether the client design requires certain pieces of information. As such, this may mean that each new game client could require an adapter to be written to cater for the differently formatted json and potential screen differences. Some games may also require additional information for "play by play" action (e.g., time-based events that may occur during the video). This additional information may also be added to the metadata. For example, FIG. 19 shows additional information in a metadata format. The additional metadata 1700 may enable the game to display graphical and/or informational elements while the video is being played. For example, using the events defined above, the system can update the display with player information while the ball is being passed.

In some examples, the metadata generation may be automated or partially automated due to the growing video library with lots of content. The system may use information from sports data feeds to retrieve metadata requirements from these feeds and produce the json metadata snippet along with a video clip.

Figure 20:
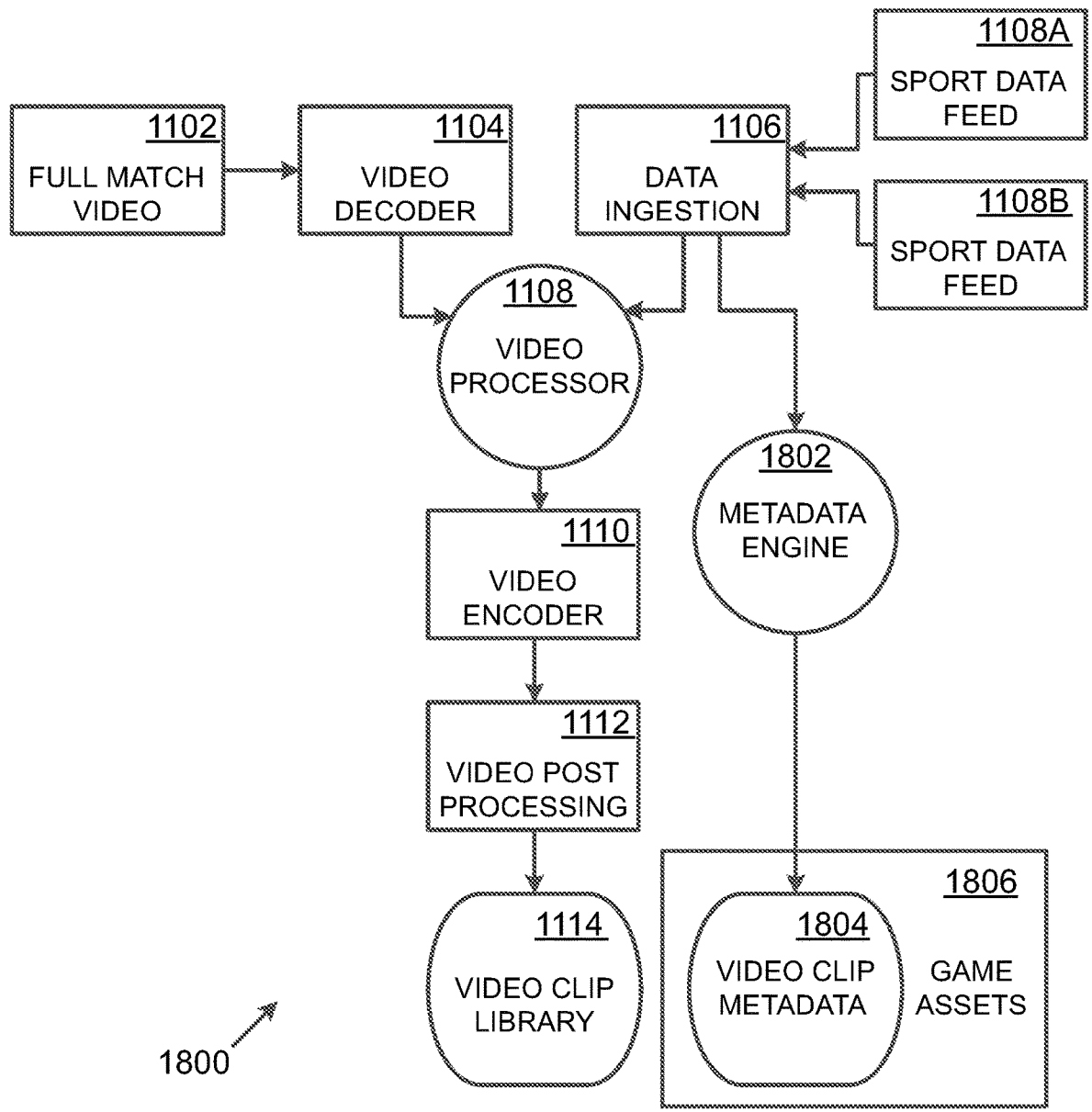
FIG. 20 depicts a system for manual editing of metadata, in accordance with example embodiments.

FIG. 20 depicts a system for manual editing of metadata, in accordance with example embodiments. As shown, FIG. 20 corresponds to the content generation process shown in FIG. 15 with the addition of metadata engine 1802, video clip metadata 1804, and game assets 1806. Particularly, the system may enable an administrator to add or otherwise edit metadata in the case that the system detects missing metadata.

Figure 21:
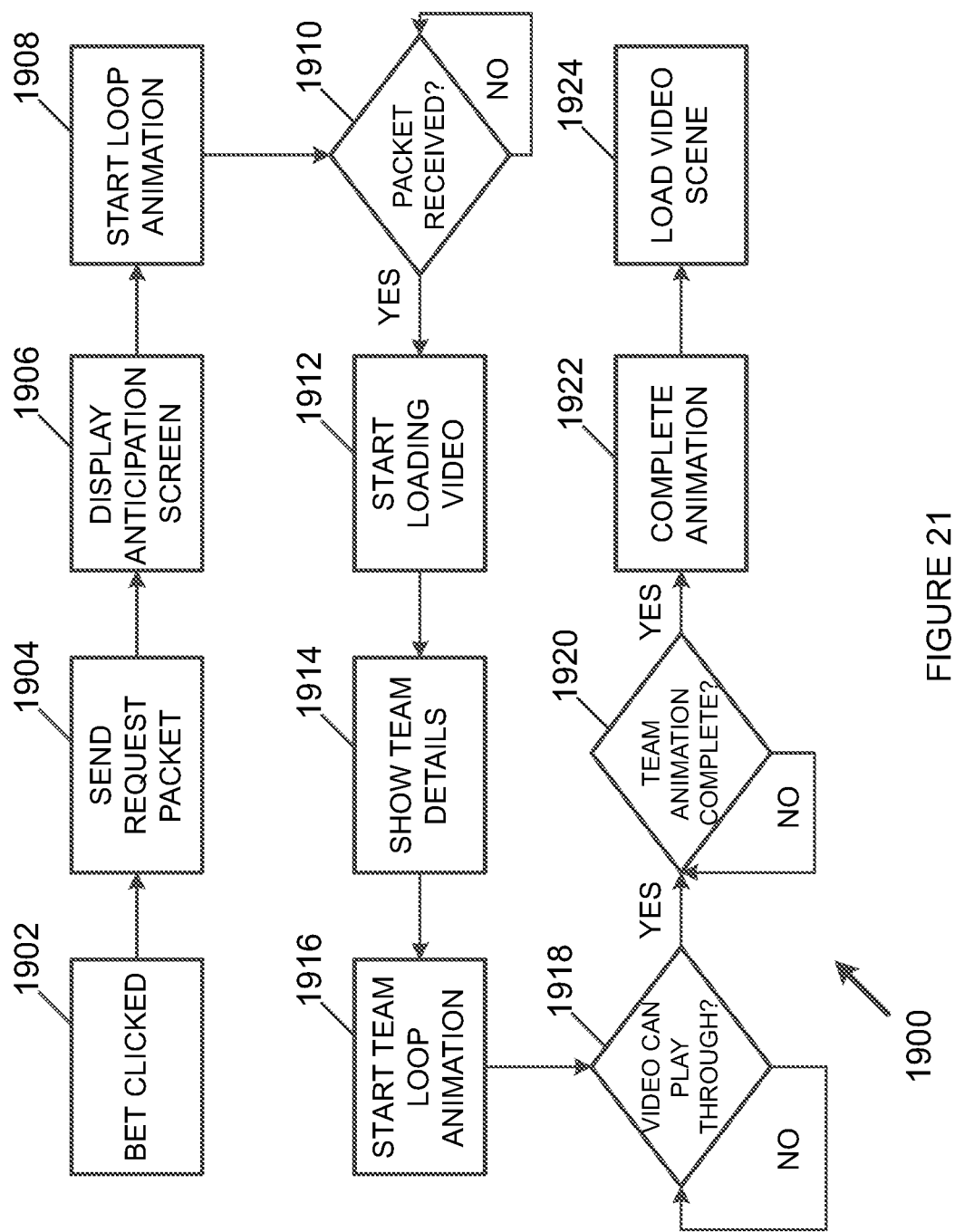
FIG. 21 depicts a video clip load sequence, in accordance with example embodiments.

FIG. 21 depicts a video clip load sequence, in accordance with example embodiments. To ensure that a user experiences continuous gameplay, the game flow 1900 may be used to mask any video loading time. The game flow 1900 includes bet clicked 1902, send request packet 1904, display anticipation screen 1906, start loop animation 1908, pack received decision 1910, start loading video 1912, show team details 1914, start team loop animation 1916, video can play through decision 1918, team animation complete decision 1920, complete animation 1922, and load video scene 1924.

As shown in FIG. 21, once a user hits the bet button at bet clicked 1402, there are two stages during the anticipation phase where the system may wait for external responses to arrive from the Internet. Particularly, the electronic device may wait for the gaming server packet to arrive and also wait for enough video clip data to load so that it can be played through before it needs to buffer before the end. These stages are represented as packet received 1910 and video can play through 1918 decisions in the game flow 1900.

To hide latency and buffering, the system may use two client-side animations loaded at the start of the game that can continuously loop until the electronic device receives a response from the server. An electronic device may be configured to play the animation once prior to moving to the next block in the sequence. In the case of the team animation, if enough video data arrives in the middle of the animation, the electronic device may need to wait for the entire animation to complete before moving to the next part of the game flow 1900.

In another embodiment, the pre-recorded event may correspond to a gender reveal wherein a user can bet on blue, pink, or another color signifying twins. An image, video clip, or other content may reveal the gender of the baby accordingly.

V. Enumerated Example Embodiments

Embodiments of the present disclosure may thus relate to one of the enumerated example embodiments (EEEs) listed below. It will be appreciated that features indicated with respect to one EEE can be combined with other EEEs.

EEE 1 is a server-implemented method comprising: providing, to an electronic device, a plurality of possible parameters relating to an as-yet unknown event; receiving, from the electronic device, at least one predicted parameter; generating, using a random number generator (RNG), a combination of parameters from the plurality of possible parameters so as to provide generated parameters; retrieving, from a library of pre-recorded events, a pre-recorded event defined by the generated parameters; transmitting, to the electronic device, the retrieved pre-recorded event for display; comparing the at least one predicted parameter with the generated parameters to determine a result; and transmitting, to the electronic device, the determined result.

EEE 2 is the server-implemented method of EEE 1, further comprising: receiving, from the electronic device, a desired category of unknown event.

EEE 3 is the server-implemented method of EEE 1 or EEE 2, wherein the server comprises: one or more libraries of pre-recorded events, wherein the one or more libraries of pre-recorded events are configured to store content corresponds to a plurality of pre-recorded events.

EEE 4 is the server-implemented method of any of the preceding EEEs, further comprising: processing the determined result to provide an indication of a success rate to the electronic device.

EEE 5 is the server-implemented method of any of the preceding EEEs, wherein the library of pre-recorded events comprises: one or more sporting events, gender reveals, news events, television shows, movies, video games, and general activities.

EEE 6 is the server-implemented method of any of the preceding EEEs, further comprising: generating a set of additional pre-recorded events; and adding the set of additional pre-recorded events to the library of pre-recorded events.

EEE 7 is a method comprising: providing, by an electronic device, a plurality of possible parameters via a user interface, wherein the plurality of possible parameters relate to an unknown event; receiving, via the user interface of the electronic device, an input indicative of one or more predicted parameters; transmitting the one or more predicted parameters; receiving display information indicative of the unknown event; displaying, via the user interface, the display information indicative of the unknown event; receiving information indicative of a result of the unknown event; and displaying, via the user interface, result information, wherein the result information is based on a comparison between the one or more predicted parameters and the result of the unknown event.

EEE 8 is the method of EEE 7, further comprising: receiving, via the user interface of the electronic device, a selection of a category of unknown events; and transmitting the selection of the category of unknown events.

EEE 9 is the method of EEE 8, further comprising: receiving the plurality of possible parameters based on transmitting the selection of the category of unknown events.

EEE 10 is the method of any of EEE 7 through EEE 9, wherein the electronic device comprises a smartphone, a laptop computer, a wearable computing device, a handheld gaming device, a gaming system, or a standalone gaming device.

EEE 11 is the method of any of EEE 7 through EEE 10, wherein the unknown event corresponds to one or more of a sporting event, a gender reveal, a news event, a television show, a movie, a video game, and a general activity.

EEE 12 is the method of any of EEE 7 through EEE 10, wherein receiving the input indicative of one or more predicted parameters further comprises: receiving a wager corresponding to the one or more predicted parameters, wherein a value of the wager is between a minimum value and a maximum value.

EEE 13 is the method of EEE 12, wherein the minimum value and the maximum value are based on a type of the unknown event.

EEE 14 is the method of any of EEE 7 through EEE 13, wherein transmitting the one or more predicted parameters comprises: transmitting the one or more predicted parameters to a server; and wherein receiving display information indicative of the unknown event comprises: receiving display information indicative of the unknown event from the server.

EEE 15 is the method of any of EEE 7 through EEE 14, wherein displaying the display information indicative of the unknown event comprises: displaying one or more of one or more images, background information, maps, statistics, videos, multimedia, or text corresponding to the unknown event.

VI. Conclusion

This detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be used, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including in substantially concurrent or in reverse order, depending on the functionality involved. Further, more or fewer steps, blocks and/or functions can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer-readable medium such as a storage device including a disk or hard drive or other storage media.

The computer-readable medium can include non-transitory computer-readable media such as computer-readable media that stores data for short periods of time like register memory, processor cache, and/or random-access memory (RAM). The computer-readable media can include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media can be any other volatile or non-volatile storage systems. A computer-readable medium can be considered a computer-readable storage medium, for example, or a tangible storage device.

Software for use in carrying out the invention can also be in transitory form, for example in the form of signals transmitted over a network such as the Internet. Moreover, a step or block that represents one or more information transmissions can correspond to information transmissions between software and/or hardware modules in the same physical device. However, other information transmissions can be between software modules and/or hardware modules in different physical devices.

Further, the described operations throughout this application need not be performed in the disclosed order, although in some examples, the recited order may be preferred. Also, not all operations need to be performed to achieve the desired advantages of disclosed machines and methods, and therefore not all operations are required.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While examples have been described in terms of select embodiments, alterations and permutations of these embodiments will be apparent to those of ordinary skill in the art. Other changes, substitutions, and alterations are also possible without departing from the disclosed machines and methods in their broader aspects as set forth in the following claims.

What is claimed is:

1. A server-implemented method comprising:
    generating a set of pre-recorded events by:
        detecting a plurality of events within a video using an artificial neural network (ANN) trained to detect events associated with a respective set of parameters within videos;
        creating video clips based on the plurality of events detected within the video; and
        adding the video clips to a library of pre-recorded events, each video clip being added to the library in association with the respective set of parameters of the video clip;
    providing, to an electronic device, a plurality of possible parameters relating to an actual or hypothetical event having an as-yet unknown outcome;
    receiving, from the electronic device, a selection of at least one predicted parameter of the plurality of possible parameters, the at least one predicted parameter constraining the as-yet unknown outcome;
    generating, using a random number generator (RNG), a combination of parameters selected from the plurality of possible parameters so as to provide generated parameters;
    retrieving, from the library of pre-recorded events, a pre-recorded event associated with the generated parameters;
    transmitting, to the electronic device, the retrieved pre-recorded event for display;
    comparing the at least one predicted parameter with the generated parameters to determine a result; and
    transmitting, to the electronic device, the determined result for display.

2. The server-implemented method of claim 1, further comprising:
    receiving, from the electronic device, a desired category of the actual or hypothetical event having the as-yet unknown outcome.

3. The server-implemented method of claim 1, wherein the server comprises:
    one or more libraries of pre-recorded events, wherein the one or more libraries of pre-recorded events are configured to store content corresponds to a plurality of pre-recorded events.

4. The server-implemented method of claim 1, further comprising:
    processing the determined result to provide an indication of a success rate to the electronic device.

5. The server-implemented method of claim 1, wherein the library of pre-recorded events comprises:
    one or more sporting events, gender reveals, news events, television shows, movies, video games, and general activities.

6. The server-implemented method of claim 1, further comprising:
  generating a set of additional pre-recorded events; and
  adding the set of additional pre-recorded events to the library of pre-recorded events.

7. A method comprising:
  providing, by an electronic device, a plurality of possible parameters via a user interface, wherein the plurality of possible parameters relate to an actual or hypothetical event having an as-yet unknown outcome;
  receiving, via the user interface of the electronic device, an input indicative of one or more predicted parameters, wherein the one or more predicted parameters constrain the as-yet unknown outcome;
  transmitting the one or more predicted parameters to a server, wherein the server generated a set of pre-recorded events by: (i) detecting a plurality of events within a video, using an artificial neural network (ANN) trained to detect events associated with a respective set of parameters within videos, (ii) creating video clips based on the detected plurality of events within the video, and (iii) adding the video clips to a library of pre-recorded events, each video clip being added to the library in association with the respective set of parameters of the video clip;
  receiving, by the electronic device and from the server, a pre-recorded event for display;
  displaying, via the user interface, the pre-recorded event;
  receiving information indicative of a result of the unknown outcome; and
  displaying, via the user interface, result information, wherein the result information is based on a comparison between the one or more predicted parameters and the result of the unknown outcome.

8. The method of claim 7, further comprising:
  receiving, via the user interface of the electronic device, a selection of a category of pre-recorded events; and
  transmitting the selection of the category of pre-recorded events.

9. The method of claim 8, further comprising:
  receiving the plurality of possible parameters based on transmitting the selection of the category of pre-recorded events.

10. The method of claim 7, wherein the electronic device comprises a smartphone, a laptop computer, a wearable computing device, a handheld gaming device, a gaming system, or a standalone gaming device.

11. The method of claim 7, wherein the pre-recorded event corresponds to one or more of a sporting event, a gender reveal, a news event, a television show, a movie, a video game, and a general activity.

12. The method of claim 7, wherein receiving the input indicative of one or more predicted parameters further comprises:
  receiving a wager corresponding to the one or more predicted parameters, wherein a value of the wager is between a minimum value and a maximum value.

13. The method of claim 12, wherein the minimum value and the maximum value are based on a type of the pre-recorded event.

14. The method of claim 7, wherein transmitting the one or more predicted parameters comprises:
  transmitting the one or more predicted parameters to a server; and
  wherein receiving the pre-recorded event comprises:
  receiving display information indicative of the pre-recorded event from the server.

15. The method of claim 7, wherein displaying the pre-recorded event comprises:
  displaying one or more of one or more images, background information, maps, statistics, videos, multimedia, or text corresponding to the pre-recorded event.

16. A non-transitory computer-readable medium configured to store instructions, that when executed by a computing system comprising one or more processors, causes the computing system to perform operations comprising:
  generating a set of pre-recorded events by:
    detecting a plurality of events within a video using an artificial neural network (ANN) trained to detect events associated with a respective set of parameters within videos;
    creating video clips based on the plurality of events detected within the video; and
    adding the video clips to a library of pre-recorded events, each video clip being added to the library in association with the respective set of parameters of the video clip;
  providing, to an electronic device, a plurality of possible parameters relating to an actual or hypothetical event having an as-yet unknown outcome;
  receiving, from the electronic device, a selection of at least one predicted parameter of the plurality of possible parameters, the at least one predicted parameter constraining the as-yet unknown outcome;
  generating, using a random number generator (RNG), a combination of parameters selected from the plurality of possible parameters so as to provide generated parameters;
  retrieving, from the library of pre-recorded events, a pre-recorded event associated with the generated parameters;
  transmitting, to the electronic device, the retrieved pre-recorded event for display;
  comparing the at least one predicted parameter with the generated parameters to determine a result; and
  transmitting, to the electronic device, the determined result for display.

17. The non-transitory computer-readable medium of claim 16, further comprising:
  receiving, from the electronic device, a desired category of the actual or hypothetical event having the as-yet unknown outcome.

18. The non-transitory computer-readable medium of claim 16, further comprising:
  processing the determined result to provide an indication of a success rate to the electronic device.

19. The non-transitory computer-readable medium of claim 16, wherein the library of pre-recorded events comprises:
  one or more sporting events, gender reveals, news events, television shows, movies, video games, and general activities.

20. The non-transitory computer-readable medium of claim 16, further comprising:
  generating a set of additional pre-recorded events; and
  adding the set of additional pre-recorded events to the library of pre-recorded events.

* * * * *